United States Patent
Asakawa

(10) Patent No.: US 12,503,617 B2
(45) Date of Patent: Dec. 23, 2025

(54) INK JET INK COMPOSITION AND RECORDING METHOD

(71) Applicant: SEIKO EPSON CORPORATION, Tokyo (JP)

(72) Inventor: Yuta Asakawa, Azumino (JP)

(73) Assignee: SEIKO EPSON CORPORATION (JP)

( * ) Notice: Subject to any disclaimer, the term of this patent is extended or adjusted under 35 U.S.C. 154(b) by 244 days.

(21) Appl. No.: 18/451,170

(22) Filed: Aug. 17, 2023

(65) Prior Publication Data

US 2024/0059917 A1 Feb. 22, 2024

(30) Foreign Application Priority Data

Aug. 18, 2022 (JP) .................... 2022-130452

(51) Int. Cl.
| | | |
|---|---|---|
| *C09D 11/322* | (2014.01) | |
| *B41J 11/00* | (2006.01) | |
| *C09D 11/38* | (2014.01) | |
| *C09D 11/40* | (2014.01) | |

(52) U.S. Cl.
CPC ............ *C09D 11/322* (2013.01); *B41J 11/002* (2013.01); *C09D 11/38* (2013.01); *C09D 11/40* (2013.01)

(58) Field of Classification Search
CPC ....... C09D 11/322; C09D 11/38; C09D 11/54; C09D 11/40; C09D 11/30; C09D 11/033; B41M 5/0017; B41M 5/0011; B41M 5/0023; B41M 5/0064; B41M 5/0047; D06P 5/30; B41J 11/002
See application file for complete search history.

(56) References Cited

U.S. PATENT DOCUMENTS

| | | | | |
|---|---|---|---|---|
| 5,510,415 A | * | 4/1996 | Zahrobsky | D06P 1/5292 347/100 |
| 7,367,666 B2 | * | 5/2008 | Doi | B41J 3/60 347/100 |
| 2010/0086691 A1 | * | 4/2010 | Mukai | C09D 11/322 427/256 |
| 2012/0306976 A1 | * | 12/2012 | Kitagawa | D06P 5/30 347/100 |
| 2015/0328904 A1 | * | 11/2015 | Yano | B41J 2/2114 347/21 |
| 2017/0355868 A1 | * | 12/2017 | Saiga | C09D 11/40 |
| 2018/0265725 A1 | | 9/2018 | Kagata et al. | |
| 2021/0071026 A1 | * | 3/2021 | Toeda | C09D 11/322 |
| 2021/0170779 A1 | * | 6/2021 | Asakawa | C09D 11/033 |

FOREIGN PATENT DOCUMENTS

JP 2018-154014 A 10/2018

* cited by examiner

*Primary Examiner* — John P Zimmermann
(74) *Attorney, Agent, or Firm* — Harness, Dickey & Pierce, P.L.C.

(57) ABSTRACT

An aqueous ink jet ink composition according to an aspect of the present disclosure is an ink jet ink composition including a pigment, a sparingly water-soluble low-molecular-weight organic compound, and a nonionic water-soluble resin, in which the pigment is a self-dispersion pigment or a resin dispersion pigment dispersed by a dispersant resin, and the nonionic water-soluble resin has a weight-average molecular weight of 2000 or greater, and a content of the nonionic water-soluble resin is 1% by mass or less with respect to a total mass of the ink composition.

12 Claims, 1 Drawing Sheet

INK JET INK COMPOSITION AND RECORDING METHOD

The present application is based on, and claims priority from JP Application Serial Number 2022-130452, filed Aug. 18, 2022, the disclosure of which is hereby incorporated by reference herein in its entirety.

BACKGROUND

1. Technical Field

The present disclosure relates to an ink jet ink composition and a recording method.

2. Related Art

An ink jet recording method of recording an image on a recording medium by jetting minute ink droplets from a nozzle of a recording head of an ink jet recording device is known, and application of this method to sign printing, label printing, packaging printing, or the like has also been examined. Among the applications, recording of an image on a recording medium by using an (aqueous) ink that contains water as one of main solvents has been examined.

For example, JP-A-2018-154014 describes an aqueous ink jet ink composition used together with a reaction solution containing an aggregating agent that aggregates components of an ink composition, the aqueous ink jet ink composition containing a first wax having a melting point of 100° C. or higher, a second wax having a melting point of 70° C. or lower, and water.

However, in recording using an aqueous ink, the ink may be difficult to wet-spread on a recording medium (poorly fills the recording medium). Therefore, for example, slight deviation in the jetting amount of ink droplets to be jetted from nozzles and slight deviation in landing positions, which are caused by individual differences between nozzles of an ink jet head, are likely to cause banding unevenness in which streak-like unevenness appears on the recorded image.

Meanwhile, in examination on an ink composition with excellent wet spreadability on a recording medium, problems of degradation of storage stability of the ink and occurrence of deviation in landing positions of ink droplets, which are caused by the ink composition, may occur.

Therefore, an ink jet ink composition with an excellent image quality (wet spreadability), excellent storage stability, and an excellent property of reducing deviation in landing positions has been required.

SUMMARY

According to an aspect of the present disclosure, there is provided an aqueous ink jet ink composition including a pigment, a sparingly water-soluble low-molecular-weight organic compound, and a nonionic water-soluble resin, in which the pigment is a self-dispersion pigment or a resin dispersion pigment dispersed by a dispersant resin, and the nonionic water-soluble resin has a weight-average molecular weight of 2000 or greater, and a content of the nonionic water-soluble resin is 1% by mass or less with respect to a total mass of the ink composition.

According to another aspect of the present disclosure, there is provided a recording method including an ink adhesion step of jetting the ink jet ink composition according to the aspect described above using an ink jet method to make the ink jet ink composition adhere to a recording medium.

DESCRIPTION OF EMBODIMENTS

Figure 1:
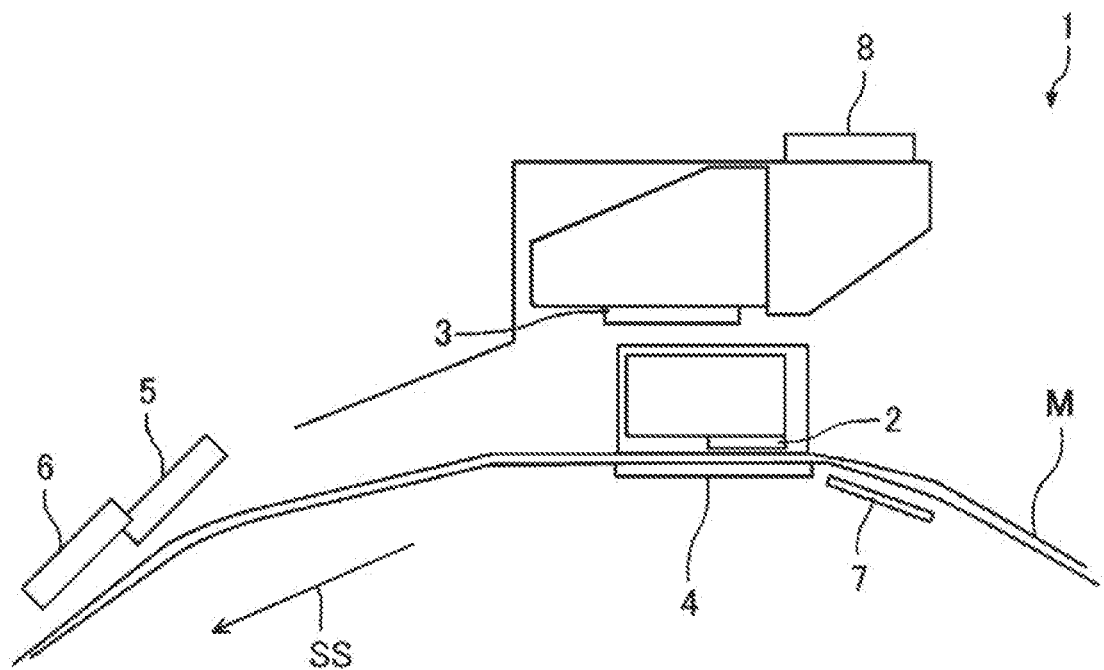
FIG. 1 is a schematic view showing an example of an ink jet recording device.

Hereinafter, embodiments of the present disclosure will be described. The embodiments described below are used to describe examples of the present disclosure. The present disclosure is not limited to the following embodiments and include various modifications made within a range not departing from the gist of the present disclosure. Further, not all the configurations described below are essential configurations of the present disclosure.

1. Ink Jet Ink Composition

An ink jet ink composition according to an embodiment of the present disclosure is an aqueous ink jet ink composition containing a pigment, a sparingly water-soluble low-molecular-weight organic compound, and a nonionic water-soluble resin, in which the pigment is a self-dispersion pigment or a resin dispersion pigment dispersed by a dispersant resin, and the nonionic water-soluble resin has a weight-average molecular weight of 2000 or greater, and the content of the nonionic water-soluble resin is 1% by mass or less with respect to the total mass of the ink composition.

In recording using an aqueous ink, the ink is unlikely to wet-spread on a recording medium (poorly fills the recording medium). Therefore, slight deviation in the jetting amount of ink droplets to be jetted from nozzles and slight deviation in landing positions, which are caused by individual differences between nozzles of an ink jet head, are likely to cause banding unevenness in which streak-like unevenness appears on the recorded image.

Recently, it was found that the banding unevenness can be reduced when the ink contains a sparingly water-soluble low-molecular-weight organic compound. The reason for this is assumed to be that the sparingly water-soluble low-molecular-weight organic compound has high hydrophobicity, and thus the wet spreadability of the ink containing the sparingly water-soluble low-molecular-weight organic compound on a recording medium can be improved. However, since the sparingly water-soluble low-molecular-weight organic compound is likely to generate foreign matter when the ink is dried, the storage stability and clogging recovering properties are likely to be degraded.

Under these circumstances, as a result of intensive examination conducted by the present inventors, it was found that the storage stability and the clogging recovering properties are excellent when the ink further contains a specific nonionic water-soluble resin. The reason for this is assumed to be that the compatibility between the sparingly water-soluble low-molecular-weight organic compound and a solvent component such as water can be further improved by a specific nonionic water-soluble resin. Further, when the molecular weight of the nonionic water-soluble resin is less than a predetermined value, an effect of suppressing degradation of the storage stability and the clogging recovering properties due to the sparingly water-soluble low-molecular-weight organic compound cannot be obtained.

Meanwhile, when the ink contains a specific nonionic water-soluble resin, the viscosity of the ink may increase or the jetting properties of the ink may be degraded, and thus deviation in landing positions of ink droplets occurs in some cases. Here, it was found that the deviation in landing positions can be remarkably reduced by setting the content of the specific nonionic water-soluble resin to less than or equal to a predetermined amount. Therefore, according to the ink jet ink composition of the present embodiment, the banding unevenness can be reduced so that the image quality (wet spreadability) is excellent, the storage stability is excellent, and the deviation in landing positions can be remarkably reduced. Further, the rub resistance of a printed material is also excellent by setting the content of the specific nonionic water-soluble resin to less than or equal to a predetermined amount.

Hereinafter, each component contained in the ink jet ink composition according to the present embodiment will be described.

1.1 Pigment

The ink jet ink composition according to the present embodiment contains a pigment. A pigment has a property that color fading due to light, gas, or the like is unlikely to occur. An image formed on a recording medium using a pigment has not only an excellent image quality but also excellent water resistance, gas resistance, light resistance, and the like, and also has enhanced storability. These properties are significant particularly when an image is formed on a recording medium such as a low-absorbing recording medium or a non-absorbing recording medium.

The pigment is not particularly limited, and examples thereof include inorganic pigments and organic pigments. As the inorganic pigments, carbon black produced by a known method such as a contact method, a furnace method, or a thermal method can be used in addition to titanium oxide and iron oxide. Further, as the organic pigments, for example, an azo pigment, a polycyclic pigment, a nitro pigment, a nitroso pigment, and an aniline pigment can be used. Examples of the azo pigment include Azo Lake, an insoluble azo pigment, a condensed azo pigment, and a chelate azo pigment. Examples of the polycyclic pigment include a phthalocyanine pigment, a perylene pigment, a perinone pigment, an anthraquinone pigment, and a quinophthalone pigment.

Examples of a pigment used in a black ink include carbon black. The carbon black is not particularly limited, and examples thereof include furnace black, lamp black, acetylene black, and channel black (C.I. Pigment Black 7). Further, examples of commercially available products thereof include No. 2300, 900, MCF88, No. 20B, No. 33, No. 40, No. 45, No. 52, MA7, MA8, MA77, MA100, and No. 2200B (all trade names, manufactured by Mitsubishi Chemical Corporation), Carbon Black FW1, FW2, FW2V, FW18, FW200, 5150, 5160, 5170, PRINTEX 35, U, V, 140U, Special Black 6, 5, 4A, 4, and 250 (all trade names, manufactured by Degussa-Huls AG), CONDUCTEX SC, RAVEN 1255, 5750, 5250, 5000, 3500, 1255, and 700 (all trade names, manufactured by Columbia Carbon), REGAL 400R, 330R, 660R, MOGUL L, MONARCH 700, 800, 880, 900, 1000, 1100, 1300, 1400, and ELFTEX 12 (all trade names, manufactured by Cabot Corporation).

A pigment used in a white ink is not particularly limited, and examples thereof include white inorganic pigments such as C.I. Pigment White 6, 18, 21, titanium oxide, zinc oxide, zinc sulfide, antimony oxide, magnesium oxide, and zirconium oxide. In addition to the white inorganic pigments, white organic pigments such as hollow resin fine particles and polymer particles of a white color can also be used.

A pigment used in a yellow ink is not particularly limited, and examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

A pigment used in a magenta ink is not particularly limited, and examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, C.I. Pigment Violet 19, 23, 32, 33, 36, 38, 43, and 50, and solid solutions of a plurality of the pigments described above.

A pigment used in a cyan ink is not particularly limited, and examples thereof include C.I. Pigment Blue 1, 2, 3, 15, 15:1, 15:2, 15:3, 15:4, 16, 18, 22, 25, 60, 65, and 66, and C.I. Vat Blue 4 and 60.

Further, a pigment used in a colored ink other than the magenta ink, the cyan ink, and the yellow ink is not particularly limited, and examples thereof include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

A pearl pigment is not particularly limited, and examples thereof include pigments having pearl gloss or interference gloss, such as titanium dioxide-coated mica, fish scale flake, and bismuth oxychloride.

A metallic pigment is not particularly limited, and examples thereof include particles consisting of a single metal such as aluminum, silver, gold, platinum, nickel, chromium, tin, zinc, indium, titanium, or copper or an alloy thereof.

The pigment may be used alone or in combination of two or more kinds thereof.

The pigment contained in the ink jet ink composition according to the present embodiment is a self-dispersion pigment or a resin dispersion pigment dispersed by a dispersant resin.

1.1.1 Self-Dispersion Pigment

The term "self-dispersion pigment" denotes a pigment that can be dispersed or dissolved in an aqueous medium without using a dispersant. Further, the expression "dispersed or dissolved in an aqueous medium without using a dispersant" denotes a state where the pigment is stably present in an aqueous medium due to a hydrophilic group on the surface of the pigment without using a dispersant for dispersing the pigment. When the self-dispersion pigment is used, since degradation of defoaming properties caused by a dispersant does not occur, foaming can be suppressed, and thus an ink with excellent jetting stability is likely to be prepared. Further, since a significant increase in viscosity due to a dispersant is suppressed, the pigment is easily handled, for example, the ink can contain a larger amount of the pigment, and the print density can be sufficiently increased.

One or more hydrophilic groups selected from the group consisting of —OM, —COOM, —CO—, —SO$_3$M, —SO$_2$M, —SO$_2$NH$_2$, —RSO$_2$M, —PO$_3$HM, —PO$_3$M$_2$, —SO₂NHCOR, —NH₃, and —NR₃ are preferable as the hydrophilic group described above.

Further, in the chemical formulae, M represents a hydrogen atom, an alkali metal, ammonium, a phenyl group which may have a substituent, or organic ammonium, and R represents an alkyl group having 1 to 12 carbon atoms or a naphthyl group which may have a substituent. Further, M and R are each independently selected.

The self-dispersion pigment is produced, for example, by performing a physical treatment or a chemical treatment on the pigment so that the hydrophilic group is bonded (grafted) to the surface of the pigment. Examples of the physical treatment include a vacuum plasma treatment. Further, examples of the chemical treatment include a wet oxidation method of oxidizing the pigment with an oxidizing agent in water and a method of bonding p-aminobenzoic acid to the surface of the pigment so that a carboxyl group is bonded thereto via a phenyl group.

1.1.2 Resin Dispersion Pigment

The term "resin dispersion pigment" denotes a pigment that can be dispersed by a dispersant resin. The dispersant resin is a resin that is used for dispersing a pigment and adheres to, is adsorbed on, or covers the pigment.

The dispersant resin is not particularly limited, and examples thereof include polyvinyl alcohols, polyvinylpyrrolidones, polyacrylic acid, an acrylic acid-acrylonitrile copolymer, a vinyl acetate-acrylic acid ester copolymer, an acrylic acid-acrylic acid ester copolymer, a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, a styrene-maleic acid copolymer, a styrene-maleic anhydride copolymer, a vinylnaphthalene-acrylic acid copolymer, a vinyl naphthalene-maleic acid copolymer, a vinyl acetate-maleic acid ester copolymer, a vinyl acetate-crotonic acid copolymer, and a vinyl acetate-acrylic acid copolymer, and salts thereof. Among these, particularly, a copolymer of a monomer containing a hydrophobic functional group and a monomer containing a hydrophilic functional group and a polymer consisting of a monomer containing both a hydrophobic functional group and a hydrophilic functional group are preferable. The copolymer can be used in any form of a random copolymer, a block copolymer, an alternating copolymer, or a graft copolymer.

Examples of the salts described above include salts with basic compounds such as ammonia, ethylamine, diethylamine, triethylamine, propylamine, isopropylamine, dipropylamine, butylamine, isobutylamine, diethanolamine, triethanolamine, tri-iso-propanolamine, aminomethylpropanol, and morpholine. The amount of the basic compounds to be added is not particularly limited as long as the amount thereof is greater than or equal to the neutralization equivalent of the dispersant resin.

As the dispersant resin, a resin containing at least one of (meth)acrylate or (meth)acrylic acid, in which the content thereof is preferably 70% by mass or greater, more preferably 80% by mass or greater, and still more preferably 90% by mass or greater with respect to the content of the constituent components of the resin, is preferable.

As the dispersant resin, a resin obtained by polymerizing preferably 70% by mass or greater and more preferably 75% by mass or greater of at least one of alkyl (meth)acrylate having 1 to 24 carbon atoms or cyclic alkyl (meth)acrylate having 3 to 24 carbon atoms as a monomer component is more preferable.

Specific examples of the monomer component include, but are not limited to, methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, t-butyl cyclohexyl (meth)acrylate, lauryl (meth)acrylate, isobornyl (meth)acrylate, cetyl (meth)acrylate, stearyl (meth)acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate, and behenyl (meth)acrylate. Further, as other monomer components for polymerization, styrene, hydroxy (meth)acrylate containing a hydroxyl group such as hydroxyethyl (meth)acrylate, hydroxypropyl (meth)acrylate, or diethylene glycol (meth)acrylate, urethane (meth)acrylate, and epoxy (meth)acrylate can also be used.

In the present specification, (meth)acryl denotes at least one of acryl or methacryl. Further, (meth)acrylate denotes at least one of acrylate or methacrylate.

The glass transition temperature (Tg) of the dispersant resin is preferably 80° C. or lower and more preferably 75° C. or lower. When the Tg thereof is 80° C. or lower, the fixing properties of the ink can be enhanced in some cases.

Further, the weight-average molecular weight of the dispersant resin measured by gel permeation chromatography (GPC) is preferably 10,000 or greater and 200,000 or less. In this manner, the storage stability of the ink is further enhanced in some cases. The weight-average molecular weight of the dispersant resin can be measured by gel permeation chromatography (GPC) in the same manner as that for the nonionic water-soluble resin described below.

The resin dispersion pigment is a pigment dispersed by a dispersant resin and formed such that the dispersant resin adheres to, is adsorbed on, or covers the pigment. Further, from the viewpoint that the fixing properties, the glossiness, and the color reproducibility of the ink are likely to be particularly excellent, a pigment coated with a dispersant resin, that is, a microencapsulated pigment is preferable as the resin dispersion pigment and is suitably used.

The resin dispersion pigment is obtained, for example, by performing a kneading and dispersing treatment on the pigment and the dispersant resin in water or a mixed solution of water and an organic solvent as necessary.

Further, among the resin dispersion pigments, the pigment coated with the dispersant resin is obtained, for example, by a phase-transfer emulsification method. According to the phase-transfer emulsification method, for example, the dispersant resin is dissolved in an organic solvent such as methanol, ethanol, isopropanol, n-butanol, acetone, methyl ethyl ketone, or dibutyl ether. A pigment is added to the obtained solution, a neutralizing agent and water are added thereto, and a kneading and dispersing treatment is performed on the solution, thereby preparing an oil-in-water type dispersion. In addition, a pigment coated with the dispersant resin as a water dispersion can be obtained by removing the organic solvent from the obtained dispersion.

The kneading and dispersing treatment can be performed, for example, by using a ball mill, a roll mill, a bead mill, a high-pressure homogenizer, a high-speed stirring type disperser, or the like.

As the neutralizing agent, a tertiary amine such as ethylamine or trimethylamine, lithium hydroxide, sodium hydroxide, potassium hydroxide, ammonia, or the like is preferable. The pH of the water dispersion to be obtained is preferably in a range of 6 to 10.

From the viewpoint of stably dispersing the pigment, a dispersant resin having a weight-average molecular weight of 10,000 to 150,000 measured by GPC is preferable as the dispersant resin that covers the pigment.

The content of the pigment (solid content) is, for example, 1% by mass or greater, more preferably 2% by mass or greater, and still more preferably 3% by mass or greater with respect to the total mass of the ink composition. Further, the content of the pigment (solid content) is preferably 10% by mass or less, more preferably 8% by mass or less, and still more preferably 6% by mass or less with respect to the total mass of the ink composition. When the content of the pigment is in the above-described ranges, the storage stability is more excellent in some cases.

1.2 Sparingly Water-Soluble Low-Molecular-Weight Organic Compound

The ink jet ink composition according to the present embodiment contains a sparingly water-soluble low-molecular-weight organic compound. The sparingly water-soluble low-molecular-weight organic compound has a high hydrophobicity. Therefore, the ink containing the sparingly water-soluble low-molecular-weight organic compound has a high affinity for a low-absorbing or non-absorbing recording medium, and the ink tends to wet-spread. As a result, an excellent property of suppressing banding unevenness is assumed to be obtained, but the reason is not limited thereto.

In the present disclosure, the term "sparingly water-soluble" denotes a property that the solubility of a substance in 100 g of water at 20° C. is 10 g or less and also includes a case where the solubility thereof is 0 g.

The upper limit of the solubility of the sparingly water-soluble low-molecular-weight organic compound in 100 g of water at 20° C. is 10 g or less, preferably 8 g or less, more preferably 6 g or less, still more preferably 4 g or less, particularly preferably 2 g or less, and more particularly preferably 1 g or less.

The lower limit of the solubility of the sparingly water-soluble low-molecular-weight organic compound in 100 g of water at 20° C. is not particularly limited, and may be 0 g or greater, 0.01 g or greater, 0.5 g or greater, or 0.1 g or greater.

The solubility in the present disclosure is acquired by the following method. First, a predetermined amount of a compound is mixed into 100 g of water in an environment of 20° C., and the mixture is stirred for 30 minutes. When the compound is in a liquid state at room temperature, the compound is determined to be dissolved after the stirring in a case where the compound does not have phase separation or a sea-island structure. Further, when the compound is in a solid state at room temperature, the compound is determined to be dissolved in a case where undissolved residues are not found.

In this manner, when a predetermined amount of a compound is mixed into 100 g of water, the largest predetermined amount among the predetermined amounts of compounds determined to be dissolved is defined as the solubility.

The term "low-molecular-weight" in the present disclosure denotes that the molecular weight is 300 or less.

The upper limit of the molecular weight of the sparingly water-soluble low-molecular-weight organic compound is 300 or less, preferably 250 or less, and more preferably 200 or less.

The standard boiling point of the sparingly water-soluble low-molecular-weight organic compound is not particularly limited, but is preferably 300° C. or lower, more preferably 280° C. or lower, and still more preferably 270° C. or lower. The lower limit of the standard boiling point is not particularly limited, but is preferably 100° C. or higher, more preferably 150° C. or higher, still more preferably 200° C. or higher, and particularly preferably 250° C. or higher.

The melting point of the sparingly water-soluble low-molecular-weight organic compound is preferably 130° C. or lower. Further, the melting point thereof is preferably −120° C. or higher, more preferably in a range of −50° C. to 60° C., and still more preferably in a range of −30° C. to 50° C.

Examples of the sparingly water-soluble low-molecular-weight organic compound include an organic solvent (in a liquid state at room temperature) and a compound in a solid state at room temperature. The sparingly water-soluble low-molecular-weight organic compound includes preferably any one or more of alkanediols, monoalcohols, and glycol monoethers and more preferably alkanediols. When the sparingly water-soluble low-molecular-weight organic compound contains those described above, the ink is more likely to wet-spread on the recording medium, the banding unevenness can be further reduced, and the image quality (wet spreadability) tends to be more excellent. Further, since foreign matter is unlikely to be generated when the ink is dried, the storage stability and the clogging recovering properties tend to be more excellent.

1.2.1 Alkanediols

Examples of the alkanediols as the sparingly water-soluble low-molecular-weight organic compound include aliphatic diols and alicyclic diols. Examples of the aliphatic diols include 1,3-alkanediols and aliphatic diols other than 1,3-alkanediols.

Examples of the aliphatic diols include aliphatic diols having 6 or more carbon atoms, and other examples thereof include aliphatic diols having 8 to 20 carbon atoms.

Examples of the 1,3-alkanediols include 2,2-diethyl-1,3-propanediol (DEPOD, standard boiling temperature of 240° C., state at 25° C.: solid, solubility of 10.0 [g/100 g of water]), 2-methyl-2-propyl-1,3-propanediol (MPPD, standard boiling temperature of 230° C., melting point of 57° C., solubility of 7.5 [g/100 g of water]), 2-butyl-2-ethyl-1,3-propanediol (BEPG, standard boiling temperature of 264° C., melting point of 43° C., solubility of 0.9 [g/100 g of water]), 2,2-diisobutyl-1,3-propanediol (DIBPD, standard boiling temperature of 253° C., melting point of 77° C., solubility of 0.5 [g/100 g of water]), 2,2-dibutyl-1,3-propanediol (DBPD, standard boiling temperature of 269° C., solubility of 0.2 [g/100 g of water]), 2,2,4-trimethyl-1,3-pentanediol (TMPD, standard boiling temperature of 232° C., melting point of 54° C., solubility of 1.9 [g/100 g of water]), and 2-ethyl-1,3-hexanediol (EHD, standard boiling temperature of 244° C., melting point of −40° C., solubility of 4.2 [g/100 g of water]).

Examples of the aliphatic diols other than 1,3-alkanediols include 1,2-octanediol (1,2OD, standard boiling temperature of 267° C., melting point of 26° C., solubility of 0.8 [g/100 g of water]), 1,9-nonanediol (1,9ND, standard boiling temperature of 289° C., melting point of 46° C., solubility of 0.6 [g/100 g of water]), 1,2-decanediol (standard boiling temperature of 279° C., melting point of 49° C., solubility of 0.1 [g/100 g of water]), and 2,4-diethyl-1,5-pentanediol (DEPD, standard boiling temperature of 257° C., liquid state (25° C.), solubility of 1.0 [g/100 g of water]).

Examples of the alicyclic diols include 2,2,4,4-tetramethyl-1, 3-cyclobutanediol (TMCD, standard boiling temperature of 220° C., melting point of 126° C., solubility of 6.1 [g/100 g of water]) and 1,4-cyclohexanedimethanol (CHDM, standard boiling temperature of 286° C., melting point of 35° C., solubility of 0.8 [g/100 g of water]).

Examples of the alicyclic structure of the alicyclic diols include alicyclic diols having an alicycle with 4 to 10 carbon atoms.

Examples of the number of carbon atoms in molecules of alicyclic diols include the number of carbon atoms of the aliphatic diols described above.

Among these, from the viewpoint that the image quality (wet spreadability), the storage stability, and the clogging recovering properties tend to be more excellent, it is preferable that the alkanediols be one or more selected from 2-butyl-2-ethyl-1,3-propanediol (BEPG) and 1,2-octanediol (1,2OD).

Further, among the 1,3-alkanediols described above, 1,3-alkanediols represented by General Formula (1) are preferable from the viewpoint that the image quality (wet spreadability), the storage stability, and the clogging recovering properties tend to be more excellent.

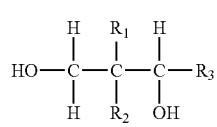

(In Formula (1), $R_1$, $R_2$, and $R_3$ each independently represent a hydrogen atom or an alkyl group, and the total number of carbon atoms of $R_1$, $R_2$, and $R_3$ is in a range of 3 to 9.)

Further, it is preferable that $R_1$ and $R_2$ in the formula do not represent a hydrogen atom at the same time. When $R_1$, $R_2$, and $R_3$ represent an alkyl group, the alkyl groups each independently have preferably 1 to 5 carbon atoms and more preferably 2 to 4 carbon atoms. The total number of carbon atoms of $R_1$, $R_2$, and $R_3$ is preferably 4 or 5 and more preferably in a range of 4 to 6. It is preferable that $R_3$ represent an alkyl group.

Examples of the 1,3-alkanediols represented by General Formula (1) include 2-methyl-2-propyl-1,3-propanediol (MPPD), 2-butyl-2-ethyl-1,3-propanediol (BEPG), 2,2,4-trimethyl-1,3-pentanediol (TMPD), and 2-ethyl-1,3-hexanediol (EHD). Among these, 2-butyl-2-ethyl-1,3-propanediol (BEPG) is preferable.

1.2.2 Monoalcohols

Examples of the monoalcohols as the sparingly water-soluble low-molecular-weight organic compound include monoalcohols having 4 to 10 carbon atoms.

Examples thereof include cyclohexanol (standard boiling temperature of 161° C., liquid state (25° C.), solubility of 3.8 [g/100 g of water]), 2-methyl-1-propanol (standard boiling temperature of 108° C., liquid state (25° C.), solubility of 7.0 [g/100 g of water]), 1-butanol (standard boiling temperature of 118° C., liquid state (25° C.), solubility of 6.6 [g/100 g of water]), 2-methyl-1-butanol (standard boiling temperature of 128° C., liquid state (25° C.), solubility of 3.0 [g/100 g of water]), 3-methyl-1-butanol (standard boiling temperature of 132° C., liquid state (25° C.), solubility of 2.6 [g/100 g of water]), 1-pentanol (standard boiling temperature of 137° C., liquid state (25° C.), solubility of 2.1 [g/100 g of water]), 4-methyl-2-pentanol (standard boiling temperature of 132° C., liquid state (25° C.), solubility of 2.2 [g/100 g of water]), and 1-hexanol (1-Hex, standard boiling temperature of 157° C., liquid state (25° C.), solubility of 0.1 [g/100 g of water]).

Among these, from the viewpoint that the image quality (wet spreadability), the storage stability, and the clogging recovering properties tend to be more excellent, 1-hexanol (1-Hex) is preferable as the monoalcohols.

1.2.3 Glycol Monoethers

Examples of the glycol monoethers as the sparingly water-soluble low-molecular-weight organic compound include ethylene glycol monohexyl ether (EGHE, standard boiling temperature of 208° C., melting point of −45° C., solubility of 1.0 [g/100 g of water]), ethylene glycol mono-2-ethyl hexyl ether (EHG, standard boiling temperature of 229° C., melting point of −105° C., solubility of 0.1 [g/100 g of water]), diethylene glycol monohexyl ether (HDG, standard boiling temperature of 259° C., liquid state (25° C.), solubility of 1.7 [g/100 g of water]), diethylene glycol mono-2-ethyl hexyl ether (EHDG, standard boiling temperature of 277° C., melting point of −82° C., solubility of 0.5 [g/100 g of water]), dipropylene glycol monobutyl ether (BPDG, standard boiling temperature of 230° C., liquid state (25° C.), solubility of 4.0 [g/100 g of water]), and tripropylene glycol monobutyl ether (BPTG, standard boiling temperature of 276° C., solubility of 4.0 [g/100 g of water]).

Among the glycol monoethers, from the viewpoint that the image quality (wet spreadability), the storage stability, and the clogging recovering properties tend to be more excellent, glycol monoethers having an ether moiety with 4 or more carbon atoms are preferable. Further, the number of carbon atoms of the ether moiety is preferably in a range of 6 to 10.

The number of carbon atoms in a molecule of the glycol monoethers is preferably in a range of 6 to 20 and more preferably in a range of 8 to 15.

Examples of the glycol monoethers include ethylene glycol monohexyl ether (EGHE), ethylene glycol mono-2-ethyl hexyl ether (EHG), diethylene glycol monohexyl ether (HDG), diethylene glycol mono-2-ethyl hexyl ether (EHDG), dipropylene glycol monobutyl ether (BPDG), and tripropylene glycol monobutyl ether (BPTG).

The content of the sparingly water-soluble low-molecular-weight organic compound is preferably 0.1% by mass or greater and 2% by mass or less with respect to the total mass of the ink composition. When the content thereof is in the above-described range, the image quality (wet spreadability) and the clogging recovering properties are likely to be further improved in a well-balanced manner. The lower limit of the content thereof is more preferably 0.3% by mass or greater, still more preferably 0.5% by mass or greater, and particularly preferably 0.7% by mass or greater. The upper limit of the content thereof is more preferably 1.7% by mass or less, still more preferably 1.5% by mass or less, and particularly preferably 1.2% by mass or less.

1.3 Nonionic Water-Soluble Resin

The ink jet ink composition according to the present embodiment contains a nonionic water-soluble resin having a weight-average molecular weight of 2000 or greater such that the content thereof is 1% by mass or less with respect to the total mass of the ink composition. In this manner, the storage stability and the clogging recovering properties are excellent, and deviation in landing positions and the rub resistance can also be improved even when the ink jet ink composition contains the above-described sparingly water-soluble low-molecular-weight organic compound. Further, the nonionic water-soluble resin is different from the above-described dispersant resin.

In the present disclosure, the term "water-soluble" denotes a property that the solubility of a substance in 100 g of water at 20° C. is greater than 10 g.

The term "nonionic" denotes a property other than the anionic or cationic property. For example, a nonionic substance is a substance that does not contain an anionic group or a cationic group in a molecule.

The solubility of the nonionic water-soluble resin in 100 g of water at 20° C. is greater than 10 g, preferably 11 g or greater, and more preferably 50 g or greater. The upper limit is not limited and may be infinite. Further, the solubility of the nonionic water-soluble resin is acquired by the same method as described above.

The weight-average molecular weight of the nonionic water-soluble resin is 2000 or greater, preferably 3000 or greater, more preferably 4000 or greater, and still more preferably 5000 or greater. The upper limit of the weight-average molecular weight is not particularly limited, but is preferably 50000 or less, more preferably 45000 or less, still more preferably 40000 or less, even still more preferably 35000 or less, particularly preferably 30000 or less, more particularly preferably 25000 or less, and even still more preferably 20000 or less.

Further, the weight-average molecular weight of the nonionic water-soluble resin can be measured as the weight-average molecular weight in terms of polystyrene using gel permeation chromatography (GPC) of L7100 System (manufactured by Hitachi, Ltd.).

The content of the nonionic water-soluble resin is 1% by mass or less with respect to the total mass of the ink composition. In this manner, ink jetting characteristics such as deviation of landing positions and the like, and the rub resistance can be enhanced.

The upper limit of the content of the nonionic water-soluble resin is preferably 0.9% by mass or less, more preferably 0.8% by mass or less, still more preferably 0.7% by mass or less, particularly preferably 0.6% by mass or less, and more particularly preferably 0.5% by mass or less. In this manner, ink jetting characteristics such as deviation of landing positions and the like, and the rub resistance tend to be further enhanced.

The lower limit of the content of the nonionic water-soluble resin is not particularly limited, but is preferably 0.05% by mass or greater, more preferably 0.1% by mass or greater, still more preferably 0.2% by mass or greater, and particularly preferably 0.3% by mass or greater. In this manner, the storage stability and the clogging recovering properties tend to be further improved.

The nonionic water-soluble resin includes preferably any one or more of polyvinylpyrrolidone, poly-N-vinylacetamide, polyvinyl alcohol, and polyalkylene oxide (polyalkylene glycol) and more preferably polyvinylpyrrolidone. In such a case, it is assumed that the compatibility between the sparingly water-soluble low-molecular-weight organic compound and a solvent component such as water tends to be further improved. In this manner, the banding unevenness can be reduced so that the image quality (wet spreadability) is excellent, the storage stability is more excellent, and the deviation in landing positions can be more remarkably reduced.

The polyvinylpyrrolidone is not limited to a homopolymer as long as the polymer is nonionic and water-soluble, and a copolymer of vinylpyrrolidone and other monomers may be used. A commercially available product may be used as the polyvinylpyrrolidone, and examples thereof include commercially available reagents such as polyvinylpyrrolidone K-30 and K-30W (both trade names, manufactured by Nippon Shokubai Co., Ltd.), PITZCOL (registered trademark) K-17L, K-30L, K-30AL, K-60L, K-17 (weight-average molecular weight of 9000), K-30 (weight-average molecular weight of 45000), K-50, CREEJUS (registered trademark) K-30, and AIPHTACT (registered trademark) K-30PH (all trade names, manufactured by DKS Co., Ltd.), PVP K-30, PVP K-25, and PVP K-17 (all trade names, manufactured by Ashland Inc.), and Sokalan K 17 P (weight-average molecular weight of 9000) (trade name, manufactured by BASF SE).

The poly-N-vinylacetamide is not limited to a homopolymer as long as the polymer is nonionic and water-soluble, and a copolymer of N-vinylacetamide and other monomers may be used. A commercially available product may be used as the poly-N-vinylacetamide, and examples thereof include GE191-107 (weight-average molecular weight of 50000) and GE191-108 (weight-average molecular weight of 10000) (both trade names, manufactured by Showa Denko K.K.).

The polyvinyl alcohol is not limited to a homopolymer as long as the polymer is nonionic and water-soluble, and a copolymer of vinyl alcohol and other monomers may be used. A commercially available product may be used as the polyvinyl alcohol, and examples thereof include PVA-203 (weight-average molecular weight of 16000) (trade name, manufactured by Kuraray Co., Ltd.).

The polyalkylene oxide is not limited to a homopolymer as long as the polymer is nonionic and water-soluble, and a copolymer of alkylene oxide and other monomers may be used. Further, polyalkylene oxide containing a plurality of kinds of alkylene oxides, such as a copolymer of ethylene oxide and propylene oxide, may be used. A commercially available product may be used as the polyalkylene oxide, and examples thereof include PEO (registered trademark)-1, 2, 3, 4, 8, 15, 18, 27, and 29 (all trade names, manufactured by Sumitomo Seika Chemicals Co., Ltd.), ALKOX (registered trademark) L-6 (weight-average molecular weight of 60000), L-8, L-11, E-30, E-45, E-60, E-75, E-100, E-160, E-240, E-300, R-150, R-400, and R-1000 (all trade names, manufactured by Meisei Chemical Works, Ltd.), and PEG-6000 (weight-average molecular weight of 8300) (trade name, manufactured by ADEKA Corporation).

1.4 Water

The ink jet ink composition according to the present embodiment is an aqueous composition. The aqueous composition is a composition containing at least water as a solvent component of the composition.

The content of water in a liquid medium component is preferably in a range of 30% to 100% by mass, more preferably in a range of 40% to 90% by mass, and still more preferably in a range of 50% to 80% by mass. Further, the liquid medium denotes a solvent component such as water or a water-soluble low-molecular-weight organic compound.

Further, the content of water is preferably 40% by mass or greater, more preferably 45% by mass or greater, still more preferably 50% by mass or greater, and particularly preferably 60% by mass or greater with respect to the total mass of the ink composition. The upper limit of the content of water is not particularly limited, but is preferably 99% by mass or less, more preferably 90% by mass or less, still more preferably 85% by mass or less, and even still more preferably 80% by mass or less with respect to the total mass of the ink composition.

Examples of water include pure water such as ion exchange water, ultrafiltration water, reverse osmosis water, or distilled water, and water obtained by reducing ionic impurities such as ultrapure water. Further, when water sterilized by irradiation with ultraviolet rays or addition of hydrogen peroxide is used, generation of bacteria or fungi can be suppressed in a case where the ink jet ink composition is stored for a long time.

1.5 Water-Soluble Low-Molecular-Weight Organic Compound

The ink jet ink composition according to the present embodiment may contain a water-soluble low-molecular-weight organic compound. Examples of the water-soluble low-molecular-weight organic compound include a compound that is in a liquid state at room temperature and a compound that is in a solid state at room temperature. When the ink contains the water-soluble low-molecular-weight organic compound, the clogging recovering properties of the ink, the storage stability, and the image quality tend to be excellent.

The definitions of "water-soluble" and "low-molecular-weight" in the water-soluble low-molecular-weight organic compound are as described above. That is, the solubility of the water-soluble low-molecular-weight organic compound in 100 g of water at 20° C. is greater than 10 g, and the molecular weight thereof is 300 or less. Further, the solubility of the water-soluble low-molecular-weight organic compound is acquired by the same method as described above.

The solubility of the water-soluble low-molecular-weight organic compound is preferably 11 g or greater and more preferably 50 g or greater. The upper limit thereof is not limited and may be infinite.

It is preferable that the water-soluble low-molecular-weight organic compound be a compound completely miscible with water or a compound miscible with water. Here, the expression "completely miscible with water" denotes that water and the organic compound mutually dissolve in each other, that is, the solubility of the organic compound in 100 g of water at 20° C. is infinite. Further, the expression "miscible with water" denotes that water and the organic compound have a finite solubility, which is at least a case where the solubility of the organic compound in 100 g of water at 20° C. is greater than 10 g.

The molecular weight of the water-soluble low-molecular-weight organic compound is more preferably 250 or less and still more preferably 200 or less. Further, the lower limit thereof is not particularly limited, but is preferably 50 or greater.

The water-soluble low-molecular-weight organic compound has a standard boiling point of preferably 150° C. to 350° C. and more preferably 150° C. to 320° C. Further, the water-soluble low-molecular-weight organic compound includes preferably a compound having a melting point of 90° C. or lower and more preferably a compound having a melting point of 80° C. or lower. The lower limit of the melting point thereof is not particularly limited, but is preferably −70° C. or higher.

Examples of the water-soluble low-molecular-weight organic compound include resin dissolving substances, polyols, glycol ethers, and alkanolamines. Examples thereof further include other water-soluble low-molecular-weight organic compounds as necessary.

Among these, resin dissolving substances, polyols, and alkanolamines are preferable as the water-soluble low-molecular-weight organic compound. Resin dissolving substances that are any of amides, sulfur-containing solvents, or cyclic ethers and alkanolamines which have a standard boiling point of higher than 250° C., and polyols having a standard boiling point of 250° C. or lower are more preferable as the water-soluble low-molecular-weight organic compound.

The content of the water-soluble low-molecular-weight organic compound in the ink jet ink composition according to the present embodiment is preferably 50% by mass or less, more preferably 40% by mass or less, and still more preferably 30% by mass or less with respect to the total mass of the ink composition. Further, the lower limit thereof is preferably 5% by mass or greater, more preferably 10% by mass or greater, and still more preferably 15% by mass or greater with respect to the total mass of the ink composition.

When the content of the water-soluble low-molecular-weight organic compound is in the above-described ranges, the compatibility between the water-soluble low-molecular-weight organic compound and the sparingly water-soluble low-molecular-weight organic compound is likely to be further enhanced, and the storage stability is likely to be more excellent.

The ink jet ink composition according to the present embodiment contains a water-soluble low-molecular-weight organic compound having a standard boiling point of 250° C. or lower, and the content of the water-soluble low-molecular-weight organic compound having a standard boiling point of 250° C. or lower is preferably 5% by mass or greater and 30% by mass or less, more preferably 10% by mass or greater and 28% by mass or less, still more preferably 15% by mass or greater and 26% by mass or less, and particularly preferably 20% by mass or greater and 23% by mass or less with respect to the total mass of the ink composition. Further, among the water-soluble low-molecular-weight organic compounds having a standard boiling point of 250° C. or lower, polyols having a standard boiling point of 250° C. or lower are preferable, and alkanediols having a standard boiling point of 250° C. or lower are more preferable, and these contents may be set to be in the above-described ranges.

In such a case, the rub resistance, the clogging recovering properties, and the deviation in landing positions tend to be further enhanced in a well-balanced manner.

1.5.1 Resin Dissolving Substance

Examples of the resin dissolving substance include amides, sulfur-containing solvents, and cyclic ethers. Particularly from the viewpoint of further improving the storage stability of the ink, the ink jet ink composition contains preferably any of amides, sulfur-containing solvents, or cyclic ethers, which have a standard boiling point of higher than 250° C., and more preferably amides having a standard boiling point of higher than 250° C. Further, the resin dissolving substance is an organic compound having a function of dissolving a resin and improving the rub resistance, but the function is not limited thereto.

Amides

Examples of the amides include cyclic amide (lactam) such as 2-pyrrolidone (2P), 2-piperidone, ε-caprolactam (CPL, standard boiling point of 267° C., solid state (25° C.)), N-methyl-ε-caprolactam, N-cyclohexyl-2-pyrrolidone, N-methylpyrrolidone, N-ethylpyrrolidone, N-butylpyrrolidone, 5-methyl-2-pyrrolidone, β-propiolactam, or ω-heptalactam, and chain-like amide such as N,N-dimethylacetoacetamide, N,N-diethylacetoacetamide, N-methylacetoacetamide, N,N-dimethyl isobutyric acid amide, N,N-dimethylformamide, N,N-diethylformamide, N,N-dimethylacetamide, N,N-diethylacetamide, N,N-dimethylpropionamide, 3-methoxy-N,N-dimethylpropanamide (DMPA), 3-n-butoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, or 3-tert-butoxy-N,N-methylethylpropionamide.

Among these, from the viewpoint of further improving the storage stability of the ink, any of 2-pyrrolidone (2P), ε-caprolactam (CPL), or 3-methoxy-N,N-dimethylpropanamide (DMPA) is preferable, and ε-caprolactam (CPL) is more preferable.

Sulfur-Containing Solvent

Examples of the sulfur-containing solvent include 3-methylsulfolane, sulfolane, ethyl isopropyl sulfone, ethyl methyl sulfone, dimethyl sulfone, dimethyl sulfoxide (DMSO), diethyl sulfoxide, tetramethylene sulfoxide, and methyl phenyl sulfoxide.

Among these, from the viewpoint of further improving the storage stability of the ink, dimethyl sulfoxide (DMSO) is more preferable.

Cyclic Ethers

Examples of the cyclic ethers include isosorbide dimethyl ether, 3-methyl-3-oxetanemethanol, 3-ethyl-3-oxetanemethanol (DMHD), 2-hydroxymethyloxetane, tetrahydrofurfuryl alcohol, solketal, glycerol formal, 1,4-dioxane-2,3-diol, and dihydrolevoglucosenone.

Among these, 3-ethyl-3-oxetanemethanol (DMHD) is more preferable from the viewpoint of further improving the storage stability of the ink.

The content of the resin dissolving substance as the water-soluble low-molecular-weight organic compound in the ink jet ink composition according to the present embodiment is preferably 10% by mass or less, more preferably 8% by mass or less, still more preferably 5% by mass or less, and particularly preferably 3% by mass or less with respect to the total mass of the ink composition. Further, the lower limit thereof is not particularly limited, but is preferably 0.05% by mass or greater, more preferably 0.1% by mass or greater, and still more preferably 0.5% by mass or greater. Further, among the resin dissolving substances, amides are preferable, and amides having a standard boiling point of higher than 250° C. are more preferable. Further, the content thereof may be set to be in the above-described ranges.

When the content of the resin dissolving substance is in the above-described ranges, the compatibility between the water-soluble low-molecular-weight organic compound and the sparingly water-soluble low-molecular-weight organic compound in the ink composition is enhanced, and the storage stability and the rub resistance tend to be more excellent.

1.5.2 Polyols

The polyols contain two or more hydroxyl groups in a molecule. Examples of the polyols include diols and polyhydric alcohols.

The polyols have preferably 15 or less carbon atoms and more preferably 10 or less carbon atoms in a molecule. The lower limit of the number of carbon atoms thereof is not particularly limited, but is preferably 2 or greater and more preferably 3 or greater.

The standard boiling point of the polyols is preferably 250° C. or lower and more preferably in a range of 150° C. to 250° C.

Diols

The diols contain two hydroxyl groups in a molecule. Examples of the diols include alkanediols and condensates in which two or more molecules of alkanediols are intermolecularly condensed between hydroxyl groups.

The number of carbon atoms of glycol in the alkanediols or a glycol unit in the condensates in which two or more molecules of the alkanediols are intermolecularly condensed between hydroxyl groups is preferably in a range of 2 to 10 and more preferably in a range of 3 to 8.

Examples of the alkanediols include ethylene glycol (standard boiling point of 198° C., miscible with water), 1,2-propanediol (propylene glycol: PG) (standard boiling point of 188° C., completely miscible with water), 1,2-butanediol (standard boiling point of 193° C., miscible with water), 1,2-pentanediol (standard boiling point of 210° C., miscible with water), 1,2-hexanediol (standard boiling point of 224° C., completely miscible with water), 1,3-propanediol (standard boiling point of 214° C., completely miscible with water), 1,4-butanediol (standard boiling point of 228° C., completely miscible with water), 2,3-butanediol (standard boiling point of 177° C., miscible with water), 1,3-butylene glycol (standard boiling point of 207° C., completely miscible with water), 3-methyl-1,3-butanediol (standard boiling point of 203° C., completely miscible with water), 2-methyl-1,3-propanediol (standard boiling point of 214° C., completely miscible with water), 2,2-dimethyl-1,3-propanediol (standard boiling point of 208° C., solubility of 83 [g/100 g of water]), 2-methylpentane-2,4-diol (standard boiling point of 197° C., completely miscible with water), 2,5-dimethyl-2,5-hexanediol (standard boiling point of 218° C., solubility of 14 [g/100 g of water]), 1,5-pentanediol (standard boiling point of 242° C., miscible with water), 3-methyl-1,5-pentanediol (standard boiling point of 250° C., completely miscible with water), 1,2-hexanediol (1,2HD, standard boiling point of 224° C., miscible with water), and 1,6-hexanediol (standard boiling point of 250° C., miscible with water).

Examples of the condensates in which two or more molecules of the alkanediols are intermolecularly condensed between hydroxyl groups include dialkylene glycol such as ethylene glycol (standard boiling point of 244° C., completely miscible with water) or dipropylene glycol (standard boiling point of 227° C., completely miscible with water), and trialkylene glycol such as triethylene glycol (standard boiling point of 276° C., completely miscible with water) or tripropylene glycol (standard boiling point of 273° C., completely miscible with water).

Polyhydric Alcohols

The polyhydric alcohols contain three or more hydroxyl groups in a molecule. Examples of the polyhydric alcohols include a compound having an alkane or a polyether structure as a skeleton and containing three or more hydroxyl groups. Examples of such a compound include glycerin (standard boiling point of 290° C., miscible with water), trimethylolethane (standard boiling point of 283° C., solubility of approximately 60 [g/100 g of water]), trimethylolpropane (standard boiling point of 295° C., completely miscible with water), and 1,2,6-hexanetriol (completely miscible with water).

Among the above-described polyols, alkanediols having a standard boiling point of 150° C. to 250° C. and 10 or less carbon atoms are more preferable, and alkanediols having a standard boiling point of 150° C. to 250° C. and 6 or less carbon atoms are still more preferable.

The content of the polyols as the water-soluble low-molecular-weight organic compound in the ink jet ink composition according to the present embodiment is preferably 30% by mass or less and more preferably 25% by mass or less with respect to the total mass of the ink composition. Further, the lower limit thereof is preferably 5% by mass or greater, more preferably 10% by mass or greater, and still more preferably 15% by mass or greater with respect to the total mass of the ink composition. Further, among the polyols, polyols having a standard boiling point of 150° C. to 250° C. are preferable, alkanediols having a standard boiling point of 150° C. to 250° C. are more preferable, and alkanediols having a boiling point of 150° C. to 250° C. and 10 or less carbon atoms are still more preferable, and the contents thereof may be set to be in the above-described ranges.

When the contents of these water-soluble low-molecular-weight organic compounds are in the above-described ranges, the rub resistance, the clogging recovering properties, and the deviation in landing positions tend to be further enhanced in a well-balanced manner.

It is preferable that the ink jet ink composition according to the present embodiment contain not greater than 3% by mass of polyols having a standard boiling point of higher than 280° C. as the water-soluble low-molecular-weight organic compound with respect to the total mass of the ink composition. Further, the ink jet ink composition contains more preferably not greater than 1% by mass of polyols and still more preferably not greater than 0.5% by mass of polyols.

In this case, the ink may or may not contain polyols having a standard boiling point of higher than 280° C., and the content thereof is less than or equal to the above-described contents even when the ink contains polyols. When the content of the polyols having a standard boiling point of higher than 280° C. is in the above-described ranges, a significant decrease in drying properties of the ink can be prevented, and as a result, a decrease in fixing properties of an image is likely to be prevented even when an image is recorded on a low-absorbing or non-absorbing recording medium. Further, the recording medium is likely to be sufficiently dried even when the temperature of the recording medium in a case of heating and drying the recording medium is set to be relatively low. Examples of such polyols having a standard boiling point of higher than 280° C. include glycerin (standard boiling point of 290° C.)

1.5.3 Glycol Ethers

The glycol ethers are compounds in which one or more hydroxyl groups of glycol are etherified. As the glycol ethers, alkylene glycol monoether or alkylene glycol diether is preferable. Alkyl ether is preferable as the etherified ether. The alkylene of alkylene glycol and the alkyl of alkyl ether constituting the glycol ethers each independently have preferably 1 to 5 carbon atoms and more preferably 2 to 4 carbon atoms. Further, glycol ethers having a standard boiling point of 150° C. to 250° C. are preferable.

Examples of the glycol ethers include alkylene glycol monoalkyl ethers such as ethylene glycol monomethyl ether (completely miscible with water), ethylene glycol monoethyl ether (miscible with water), ethylene glycol monoisopropyl ether (solubility of 100 [g/100 g of water]), ethylene glycol monopropyl ether (miscible with water), ethylene glycol monoisobutyl ether (solubility of 75.5 [g/100 g of water]), ethylene glycol mono-tert-butyl ether (miscible with water), ethylene glycol monobutyl ether (solubility of 100 [g/100 g of water]), diethylene glycol monomethyl ether (completely miscible with water), diethylene glycol monoethyl ether (completely miscible with water), diethylene glycol monoisopropyl ether (miscible with water), diethylene glycol monoisobutyl ether (completely miscible with water), diethylene glycol monobutyl ether (completely miscible with water), triethylene glycol monomethyl ether (completely miscible with water), triethylene glycol monoethyl ether (completely miscible with water), triethylene glycol monobutyl ether (miscible with water), tetraethylene glycol monomethyl ether (miscible with water), propylene glycol monomethyl ether (miscible with water), propylene glycol monoethyl ether (completely miscible with water), propylene glycol monopropyl ether (miscible with water), dipropylene glycol monomethyl ether (completely miscible with water), dipropylene glycol monopropyl ether (solubility of 19 [g/100 g of water]), tripropylene glycol monomethyl ether (completely miscible with water), 1,3-propanediol monomethyl ether (3-methoxy-1-propanol) (completely miscible with water), and 1,3-butylene glycol-3-monomethyl ether (3-methoxy-1-butanol) (miscible with water).

Examples of the glycol ethers include alkylene glycol dialkyl ethers (glymes) such as ethylene glycol dimethyl ether (completely miscible with water), diethylene glycol dimethyl ether (completely miscible with water), diethylene glycol methyl ethyl ether (completely miscible with water), diethylene glycol diethyl ether (completely miscible with water), triethylene glycol dimethyl ether (completely miscible with water), tetraethylene glycol dimethyl ether (completely miscible with water), dipropylene glycol dimethyl ether (solubility of 52.6 [g/100 g of water]), and tripropylene glycol dimethyl ether (solubility of 23.6 [g/100 g of water]).

Further, diether is more preferable to monoether as the glycol ethers described above from the viewpoint that the resin is likely to be dissolved or swollen in the ink and the rub resistance of an image to be formed is improved. Further, monoether is preferable from the viewpoint that the wet spreadability of the ink is excellent.

1.5.4 Alkanolamines

The alkanolamines are compounds containing a hydroxyl group and an amino group in an alkane skeleton. The alkanolamines contain 1 or more hydroxyl groups, preferably 1 to 5 hydroxyl group, and more preferably 2 or 3 hydroxyl groups in a molecule. The alkanolamines have preferably 1 to 20 carbon atoms, more preferably 2 to 10 carbon atoms, and still more preferably 6 to 9 carbon atoms in a molecule. The alkane skeleton has preferably 1 to 6 carbon atoms and more preferably 2 to 4 carbon atoms per alkane skeleton. The alkanolamines contain 1 or more amino groups, preferably 1 to 5 amino groups, and more preferably 1 or 2 amino groups in a molecule.

The alkanolamines are not particularly limited, and examples thereof include ethanolamine (miscible with water), N-methylethanolamine (solubility of 100 [g/100 g of water]), N,N-dimethylethanolamine (completely miscible with water), N-ethylethanolamine (miscible with water), N-butylethanolamine (miscible with water), N,N-diethylethanolamine (miscible with water), diethanolamine (solubility of 100 [g/100 g of water]), N-methyldiethanolamine (solubility of 100 [g/100 g of water]), N-ethyldiethanolamine (miscible with water), N-butyldiethanolamine (miscible with water), N-tert-butyldiethanolamine (completely miscible with water), triethanolamine (completely miscible with water), isopropanolamine (miscible with water), N,N-dimethylisopropanolamine (completely miscible with water), N,N-diethylisopropanolamine (miscible with water), diisopropanolamine (solubility of 87 [g/100 g of water]), triisopropanolamine (TIPA, standard boiling point of 301° C., solubility of 83 [g/100 g of water]), N,N-dimethylpropanolamine (miscible with water), 2-amino-1-propanol (completely miscible with water), 2-amino-2-methyl-1-propanol (completely miscible with water), 5-amino-1-pentanol (miscible with water), 2-amino-2-methyl-1,3-propanediol (miscible with water), 2-amino-2-hydroxymethyl-1,3-propanediol (miscible with water), 3-amino-1,2-propanediol (miscible with water), 3-methylamino-1,2-propanediol (completely miscible with water), tripropanolamine, and tributanolamine.

Among these, triethanolamine and triisopropanolamine (TIPA) are preferable, and triisopropanolamine (TIPA) is more preferable.

The content of the alkanolamines is preferably 5% by mass or less, more preferably 3% by mass or less, and still more preferably 1% by mass or less with respect to the total mass of the ink composition. The lower limit thereof is not particularly limited, but is preferably 0.05% by mass or greater, more preferably 0.1% by mass or greater, and still more preferably 0.5% by mass or greater.

1.6 Water-Dispersible Resin

The ink jet ink composition according to the present embodiment may contain a water-dispersible resin. The water-dispersible resin can be blended as an emulsion of a water-soluble resin or resin particles. Such a water-dispersible resin may function as a so-called fixing resin that improves the adhesiveness and the rub resistance of components of a pigment ink adhering to a recording medium. An emulsion of resin particles is preferable as the water-dispersible resin.

Examples of the water-dispersible resin include resins consisting of a polyurethane-based resin, an acrylic resin, a fluorene-based resin, a polyolefin-based resin, a rosin-modified resin, a terpene-based resin, a polyester-based resin, a polyamide-based resin, an epoxy-based resin, a vinyl chloride-based resin, an ethylene vinyl acetate-based resin, a vinyl acetate resin, a butadiene resin, a styrene resin, a crosslinked acrylic resin, a crosslinked styrene resin, a benzoguanamine resin, a phenol resin, a silicone resin, an epoxy resin, a paraffin resin, and a fluororesin. These resins are handled in the form of an emulsion, but may be in the form of powder. Further, the resin can be used alone or in combination of two or more kinds thereof.

Among these resins, from the viewpoint of further improving the rub resistance, the water-dispersible resin includes preferably any one or more of an acrylic resin, a polyurethane-based resin, a polyester-based resin, and a polyolefin-based resin and more preferably any one or more of an acrylic resin and a polyolefin-based resin.

The polyurethane-based resin is a general term for resins having a urethane bond. In addition to the urethane bond, a polyether type urethane resin having an ether bond in the main chain, a polyester type urethane resin having an ester bond in the main chain, a polycarbonate type urethane resin having a carbonate bond in the main chain, or the like may be used as the polyurethane-based resin. A commercially available product may be used as the polyurethane-based resin and may be selected from SUPERFLEX 210, 460, 460s, 840, and E-4000 (all trade names, manufactured by DKS Co., Ltd.), and the like and used.

The acrylic resin is a general term for polymers obtained by polymerizing at least an acrylic monomer such as (meth) acrylic acid or (meth)acrylic acid ester as one component, and examples thereof include resins obtained from an acrylic monomer and copolymers of an acrylic monomer and monomers other than the acrylic monomer. Further, examples thereof include an acryl-vinyl-based resin that is a copolymer of an acrylic monomer and a vinyl-based monomer. Further, other examples thereof include a copolymer of an acrylic monomer and a vinyl-based monomer such as styrene. Acrylamide, acrylonitrile, or the like can also be used as the acrylic monomer.

A commercially available product may be used as the resin emulsion containing an acrylic resin as a raw material, and may be selected from FK-854 (trade name, manufactured by CHIRIKA Co., Ltd.), MOVINYL 952B and 718A (both trade names, manufactured by The Nippon Synthetic Chemical Industry Co., Ltd.), NipolLX852 and LX874 (trade names, manufactured by Zeon Corporation), POLYSOL AT860 (trade name, manufactured by Showa Denko K.K.), and VONCOAT AN-11905, YG-651, AC-501, AN-1170, and 4001 (all trade names, manufactured by DIC Corporation, acrylic resin emulsion) and used.

In the present specification, the acrylic resin may be a styrene acrylic resin as described above. Further, in the present specification, the term "(meth)acryl" denotes at least one of acryl or methacryl.

The styrene acrylic resin is a copolymer obtained from a styrene monomer and an acrylic monomer, and examples thereof include a styrene-acrylic acid copolymer, a styrene-methacrylic acid copolymer, a styrene-methacrylic acid-acrylic acid ester copolymer, a styrene-α-methylstyrene-acrylic acid copolymer, and a styrene-α-methylstyrene-acrylic acid-acrylic acid ester copolymer. A commercially available product may be used as the styrene acrylic resin, and examples thereof include JONCRYL 62J, 7100, 390, 711, 511, 7001, 631, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (all trade names, manufactured by BASF SE), and MOVINYL 966A and 975N (both trade names, manufactured by The Nippon Synthetic Chemical Industry Co., Ltd.).

The vinyl chloride-based resin may be a vinyl chloride-vinyl acetate copolymer.

Examples of the polyolefin-based resin include olefins such as ethylene, propylene, and butylene, resins produced from derivatives thereof, and copolymers thereof, and specific examples thereof include a polyethylene-based resin, a polypropylene-based resin, and a polybutylene-based resin. A commercially available product may be used as the polyolefin-based resin, and specific examples thereof include NOPCOTE PEM17 (trade name, manufactured by San Nopco Ltd.), CHEMIPEARL W4005 (trade name, manufactured by Mitsui Chemicals, Inc.), AQUACER 515 and AQUACER 593 (both trade names, manufactured by BYK-Chemie GmbH), and HYTEC E-6500 (manufactured by Toho chemical Industry Co., Ltd., polyethylene-based resin).

The content of the water-dispersible resin is preferably 0.1% by mass or greater and 25.0% by mass or less, more preferably 1.0% by mass or greater and 15.0% by mass or less, still more preferably 2.0% by mass or greater and 12.0% by mass or less, and particularly preferably 3.0% by mass or greater and 10.0% by mass or less in terms of the solid content with respect to the total mass of the ink composition.

The content of the acrylic resin in the water-dispersible resin is preferably 0.05% by mass or greater and 20.0% by mass or less, more preferably 1.0% by mass or greater and 15.0% by mass or less, still more preferably 2.0% by mass or greater and 10.0% by mass or less, and particularly preferably 3.0% by mass or greater and 8.0% by mass or less with respect to the total mass of the ink composition.

The content of the polyolefin-based resin in the water-dispersible resin is preferably 0.1% by mass or greater and 5% by mass or less, more preferably 0.2% by mass or greater and 4% by mass or less, and still more preferably 0.3% by mass or greater and 3% by mass or less with respect to the total mass of the ink composition.

1.7 Surfactant

The ink jet ink composition according to the present embodiment may contain a surfactant. The surfactant is not particularly limited, and examples thereof include an acetylene glycol-based surfactant, a fluorine-based surfactant, and a silicone-based surfactant.

The acetylene glycol-based surfactant is not particularly limited, and examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all trade names, manufactured by Air Products and Chemicals, Inc.), OLFINE B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all trade names, manufactured by Nissin Chemical Co., Ltd.), and ACETYLENOL E00, E00P, E40, and E100 (all trade names, manufactured by Kawaken Fine Chemicals Co., Ltd.).

A fluorine-modified polymer is preferably used as the fluorine-based surfactant, and specific examples thereof include BYK-340 (trade name, manufactured by BYK-Chemie GmbH).

The silicone-based surfactant is not particularly limited, and preferred examples thereof include a polysiloxane-based compound. The polysiloxane-based compound is not particularly limited, and examples thereof include polyether-modified organosiloxane. Examples of a commercially available product of the polyether-modified organosiloxane include BYK-306, BYK-307, BYK-333, BYK-341, BYK-345, BYK-346, BYK-348, and BYK-349 (all trade names, manufactured by BYK-Chemie GmbH), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemical Co., Ltd.), and SILFACE SAG503A and SILFACE SAG014 (both trade names, manufactured by manufactured by Nissin Chemical Co., Ltd.).

The above-described surfactants may be used alone or in combination of two or more kinds thereof.

The content of the surfactant is preferably 0.1% by mass or greater and 2.0% by mass or less with respect to the total mass of the ink composition. The upper limit of the content of the surfactant is more preferably 1.5% by mass or less, still more preferably 1.0% by mass or less, particularly preferably 0.8% by mass or less, and more particularly preferably 0.5% by mass or less with respect to the total mass of the ink composition. The lower limit of the content of the surfactant is not particularly limited, but may be 0.2% by mass or greater or 0.3% by mass or greater.

Further, it is preferable that the content of the silicone-based surfactant or the fluorine-based surfactant among the above-described surfactants be set to be in the above-described ranges. In addition, it is preferable that the content of the silicone-based surfactant among the above-described surfactants be set to be in the above-described ranges.

Typically, the image quality tends to be further improved when the ink composition contains the silicone-based surfactant, but the rub resistance or defoaming properties are likely to be degraded. However, even when the amount of the silicone-based surfactant to be added to the ink jet ink composition according to the present embodiment is set to be small in the above-described ranges, the image quality is excellent, and the rub resistance and the defoaming properties tend to be enhanced.

1.8 Other Components

The ink jet ink composition according to the present embodiment may contain various additives such as an antifoaming agent, a chelating agent, a rust inhibitor, a fungicide, an antioxidant, a reduction inhibitor, and an evaporation accelerator as necessary in addition to the components described above.

1.9 Preparation Method and Physical Properties

The ink jet ink composition according to the present embodiment is obtained by mixing the above-described components in any order and filtering the mixture as necessary to remove impurities. As a method of mixing the components, a method of sequentially adding the materials to a container provided with a stirring device such as a mechanical stirrer or a magnetic stirrer and stirring and mixing the mixture is suitably used. As a filtering method, centrifugal filtration, filter filtration, or the like can be performed as necessary.

From the viewpoint of the balance between the image quality and the reliability of the ink for ink jet recording, the surface tension (static surface tension) of the ink jet ink composition according to the present embodiment at 20° C. is preferably 18 mN/m or greater and 40 mN/m or less, more preferably 20 mN/m or greater and 35 mN/m or less, and still more preferably 22 mN/m or greater and 33 mN/m or less. Further, the surface tension can be measured by confirming the surface tension when a platinum plate is wet with the ink in an environment of 20° C. using, for example, an automatic surface tensiometer CBVP-Z (trade name, manufactured by Kyowa Interface Science Co., Ltd.).

From the same viewpoint as described above, the viscosity of the ink at 20° C. is preferably 3 mPa·s or greater and 10 mPa·s or less and more preferably 3 mPa·s or greater and 8 mPa·s or less. Further, the viscosity can be measured in an environment of 20° C. using a viscosity tester MCR-300 (trade name, manufactured by Physica Inc.).

1.10 Applications

Preferable applications of the ink jet ink composition according to the present embodiment will be described below.

1.10.1 Recording Medium

It is preferable that the ink jet ink composition according to the present embodiment be used for recording an image on a low-absorbing recording medium or a non-absorbing recording medium. In the recording of an image on a low-absorbing recording medium or a non-absorbing recording medium, since the ink is difficult to wet-spread on the recording medium (poorly fills the recording medium), slight deviation in the jetting amount of ink droplets to be jetted from nozzles and slight deviation in landing positions are likely to cause banding unevenness in which streak-like unevenness appears on the recorded image. However, according to the ink jet ink composition of the present embodiment, the banding unevenness can be reduced so that the image quality (wet spreadability) is excellent, the storage stability is excellent, and the deviation in landing positions can be remarkably reduced even when the ink is used for recording an image on such a recording medium.

The term "low-absorbing recording medium or non-absorbing recording medium" denotes a recording medium having a property of not absorbing a liquid or hardly absorbing a liquid. Quantitatively, the term "low-absorbing recording medium or non-absorbing recording medium" denotes "recording medium in which the water absorption amount from the start of contact to 30 msec$^{1/2}$ in the Bristow method is 10 mL/m$^2$ or less". The Bristow method is a method that has been widely used as a method of measuring the liquid absorption amount in a short time and that is also adopted by Japan Technical Association of The Pulp And Paper Industry (JAPAN TAPPI). The details of the test method are described in Standard No. 51 "Paper and Paperboard, Liquid Absorbency Test Method, Bristow Method" of "Paper and Pulp Test Method (2000) by JAPAN TAPPI".

Low-Absorbing Recording Medium

The low-absorbing recording medium is not particularly limited, and examples thereof include coating paper provided with a coating layer that has a surface for receiving an ink. The coating paper is not particularly limited, and examples thereof include actual printing paper such as art paper, coated paper, and matte paper. Further, the coating layer is a layer that is difficult to absorb an ink, and examples thereof include a layer coated with particles of an inorganic compound or the like together with a binder.

Non-Absorbing Recording Medium

The non-absorbing recording medium is not particularly limited, and examples thereof include recording media such as plastics, glass, metals, and ceramics.

When the recording medium is made of plastics, examples of such a recording medium include a plastic film. Examples of the plastic film include a polyester film, a polyurethane film, a polycarbonate film, a polyphenylene sulfide film, a polyimide film, and a polyamide-imide film. Other examples thereof include a film formed of a polyolefin such as polyethylene or polypropylene and a film formed of polyvinyl chloride. Further, plastic films derived from bio-mass are also exemplified, and examples of such films include films formed of PLA, PBS, PHA, bio-PE, bio-PP, and bio-PET.

Further, such a recording medium may be a film consisting of plastics, a recording medium obtained by coating a base material such as paper with plastics, or a recording medium obtained by bonding a plastic film onto a base material such as paper.

When the recording medium is made of a metal, a base material consisting of a metal such as iron, silver, copper, or aluminum or a base material made of plastics or the like other than metals, which has a recording surface on which the above-described various metals are vapor-deposited. That is, such a recording medium is not limited as long as the recording surface consists of a metal.

Further, the recording medium may be a recording medium having light transmitting properties such as colorless transparency, semitransparency, or colored transparency. Further, a recording medium that does not have light transmitting properties, such as a chromatic opaque recording medium or an achromatic opaque recording medium may be used. Further, a recording medium having a three-dimensional shape such as a sheet shape, a spherical shape, or a rectangular parallelepiped shape, a paper container, or the like may be used as the recording medium.

Among the above-described low-absorbing recording media and non-absorbing recording media, from the viewpoint that the effects of the present disclosure can be further exhibited, a non-absorbing recording medium is preferable, and a recording medium made of plastics is more preferable. That is, when such a recording medium is used, the ink is more difficult to wet-spread, and thus particularly banding unevenness is likely to occur, but according to the ink jet ink composition of the present embodiment, the banding unevenness can be reduced so that the image quality (wet spreadability) is excellent, the storage stability is excellent, and the deviation in landing positions can be remarkably reduced even when such a recording medium is used.

1.10.2 Treatment Liquid

It is preferable that the ink jet ink composition according to the present embodiment be used for recording an image together with a treatment liquid containing an aggregating agent. The image quality can be improved by using a treatment liquid that aggregates components of the ink in combination with the ink. However, since ink droplets are more difficult to wet-spread on the recording medium in this aspect, banding unevenness is more likely to occur. On the contrary, according to the ink jet ink composition of the present embodiment, the banding unevenness can be reduced so that the image quality (wet spreadability) is excellent, the storage stability is excellent, and the deviation in landing positions can be remarkably reduced even when the treatment liquid containing an aggregating agent is used together with the ink for recording an image.

Further, "treatment liquid" is not an ink composition used for coloring a recording medium, but is an auxiliary liquid used together with the ink composition. Further, a treatment liquid capable of aggregating or thickening the components of the ink composition is preferable, and a treatment liquid containing an aggregating agent that aggregates or thickens the components of the ink composition is more preferable as the treatment liquid. The treatment liquid may contain a coloring material such as a pigment, and the content of the coloring material is preferably 0.2% by mass or less, more preferably 0.1% by mass or less, and still more preferably 0.05% by mass or less with respect to the total mass of the treatment liquid. Further, the lower limit thereof is 0% by mass. It is preferable that the treatment liquid do not contain a coloring agent.

Hereinafter, each component contained in the treatment liquid will be described.

Aggregating Agent

The treatment liquid contains an aggregating agent. Such an aggregating agent can rapidly react with the components such as a pigment and a resin contained in the ink composition. In this manner, the dispersion state of the components in the ink composition is destroyed so that the components are aggregated, and thus the aggregate inhibits permeation of the pigment into the recording medium, which is considered to be excellent in terms of improving the image quality of the recorded image.

Examples of the aggregating agent include polyvalent metal salts, cationic compounds such as cationic resins and cationic surfactants, and organic acids. These aggregating agents may be used alone or in combination of two or more kinds thereof. Among these aggregating agents, from the viewpoint of excellent reactivity with the components contained in the ink composition, it is preferable to use at least one aggregating agent selected from the group consisting of polyvalent metal salts, organic acids, and cationic resins.

The polyvalent metal salt is a compound formed of divalent or higher polyvalent metal ions and anions bonded to these polyvalent metal ions and soluble in water. Specific examples of the polyvalent metal ions include divalent metal ions such as $Ca^{2+}$, $Cu^{2+}$, $Ni^{2+}$, $Mg^{2+}$, $Zn^{2+}$, and $Ba^{2+}$, and trivalent metal ions such as $Al^{3+}$, $Fe^{3+}$, and $Cr^{3+}$. Examples of the anions include $Cl^-$, $I^-$, $Br^-$, $SO_4^{2-}$, $ClO_3^-$, $NO^{3-}$, $HCOO^-$, and $CH_3COO^-$. Among these polyvalent metal salts, from the viewpoints of the stability of the treatment liquid and the reactivity as the aggregating agent, a calcium salt and a magnesium salt are preferable.

Suitable examples of the organic acids include poly(meth) acrylic acid, formic acid, acetic acid, propionic acid, glycolic acid, oxalic acid, malonic acid, malic acid, maleic acid, ascorbic acid, succinic acid, glutaric acid, adipic acid, fumaric acid, citric acid, tartaric acid, lactic acid, pyruvic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of compounds thereof, and salts thereof. The organic acids may be used alone or in combination of two or more kinds thereof. Further, salts of the organic acids that are also polyvalent metal salts are set to be included in polyvalent metal salts.

Examples of the cationic resin include a cationic urethane resin, a cationic olefin resin, and a cationic amine-based resin. The cationic amine-based resin may be a resin containing an amino group, and examples thereof include an allylamine resin, a polyamine resin, a quaternary ammonium salt polymer, and a polyamide resin. Examples of the polyamine resin include a resin containing an amino group in the main skeleton of the resin. Examples of the allylamine resin include a resin having a structure derived from an allyl group in the main skeleton of the resin. Examples of the quaternary ammonium salt polymer include a resin having a quaternary ammonium salt in the structure. Examples of the polyamide resin include a resin containing an amide group in the main skeleton of the resin and containing an amino group in a side chain of the resin. Among the cationic resins, the cationic amine-based resin is preferable from the viewpoints of excellent reactivity and availability.

The concentration of the aggregating agent in the treatment liquid is preferably 0.5% by mass or greater, more preferably 1% by mass or greater, and still more preferably 3% by mass or greater with respect to the total mass of the treatment liquid. Further, the concentration of the aggregating agent in the treatment liquid is preferably 20% by mass or less, more preferably 15% by mass or less, still more preferably 10% by mass or less, and particularly preferably 8% by mass or less with respect to the total mass of the treatment liquid.

Water

The treatment liquid may contain water. The kind, the content, and the like of water that can be used are set to be the same as those for the ink jet ink composition described above.

Water-Soluble Low-Molecular-Weight Organic Compound

The treatment liquid may contain a water-soluble low-molecular-weight organic compound. The kind, the content, and the like of the water-soluble low-molecular-weight organic compound that can be used are set to be the same as those for the ink jet ink composition described above.

Surfactant

The treatment liquid may contain a surfactant. The kind, the content, and the like of the surfactant that can be used are set to be the same as those for the ink jet ink composition described above.

Other Components

The treatment liquid may contain the components contained in the ink jet ink composition described above, such as the sparingly water-soluble low-molecular-weight organic compound, the nonionic water-soluble resin, and the water-dispersible resin, as components other than the above-described components, and the contents thereof and the like can be set to be the same as described above. Further, the treatment liquid may contain various additives such as an antifoaming agent, a chelating agent, a rust inhibitor, a fungicide, an antioxidant, a reduction inhibitor, and an evaporation accelerator as necessary.

Preparation Method and Physical Properties

A method of preparing the treatment liquid and the physical properties thereof can be set to be the same as those for the ink jet ink composition described above.

2. Recording Method

A recording method according to an embodiment of the present disclosure includes an ink adhesion step of jetting the ink jet ink composition described above using an ink jet method to make the ink jet ink composition adhere to a recording medium.

According to the recording method of the present embodiment, since the ink jet ink composition described above is used for the recording method, the banding unevenness can be reduced so that the image quality (wet spreadability) is excellent, the storage stability is excellent, and the deviation in landing positions can be remarkably reduced.

Hereinafter, each step of the recording method according to the present embodiment will be described.

2.1 Ink Adhesion Step

The recording method according to the present embodiment includes an ink adhesion step of jetting the ink jet ink composition described above using an ink jet method to make the ink jet ink composition adhere to a recording medium.

The recording medium is not particularly limited, and examples thereof include an absorbing recording medium such as paper, an ink-absorbing film, or cloth, a low-absorbing recording medium such as actual printing paper, and a non-absorbing recording medium such as a metal, glass, or a polymer. Among these, from the viewpoint that the effects of the present disclosure can be further exhibited, the low-absorbing recording medium or the non-absorbing recording medium is preferable. The low-absorbing recording medium and the non-absorbing recording medium are as described above, and thus the description thereof will not be repeated.

The adhesion amount of the ink composition in a region of the recording medium to which the ink adheres per unit area of the recording medium in the ink adhesion step is preferably 3 mg/inch$^2$ or greater, more preferably 5 mg/inch$^2$ or greater, and still more preferably 10 mg/inch$^2$ or greater.

The adhesion amount of the ink composition per unit area of the recording medium is preferably 20 mg/inch$^2$ or less, more preferably 18 mg/inch$^2$ or less, and still more preferably 16 mg/inch$^2$ or less.

When the adhesion amount of the ink composition is in the above-described ranges, the banding unevenness tends to be further reduced. It is preferable that the adhesion amount of the ink composition in a region where the adhesion amount of the ink is the maximum per unit area of the recording medium in the region of the recording medium to which the ink adheres, that is, the maximum adhesion amount of the ink be set to be in the above-described ranges.

In the ink adhesion step, the surface temperature of the recording medium when the ink jet ink composition described above adheres to the recording medium is preferably 55° C. or lower. In this case, the ink adhesion step may be performed by heating the recording medium or without heating the recording medium. That is, even when the recording medium is heated, it is preferable that the recording medium be heated by setting the surface temperature of the recording medium to 55° C. or lower.

The upper limit of the surface temperature of the recording medium during the adhesion of the ink is preferably 55° C. or lower, more preferably 50° C. or lower, still more preferably 45° C. or lower, particularly preferably 40° C. or lower, more particularly preferably 35° C. or lower, and even still more preferably 28° C. or lower. Further, the lower limit thereof is 20° C. or higher, more preferably 23° C. or higher, particularly preferably 25° C. or higher, still more preferably 28° C. or higher, even still more preferably 35° C. or higher, and even still more preferably 40° C. or higher.

2.2 Treatment Liquid Adhesion Step

The recording method according to the present embodiment may include a treatment liquid adhesion step of making the treatment liquid containing an aggregating agent adhere to the recording medium. Further, the treatment liquid can be set to be the same as the treatment liquid described above.

The treatment liquid adhesion step can be performed simultaneously with, before, or after the ink adhesion step described above.

A method of adhering the treatment liquid include dip coating of dipping a recording medium in the treatment liquid, roller coating of adhering the treatment liquid using a brush, a roller, a spatula, a roll coater, or the like, spray coating of spraying the treatment liquid using a spray device or the like, and ink jet coating of adhering the treatment liquid using an ink jet method. Among these, ink jet coating is preferable.

The adhesion amount of the treatment liquid in a region of the recording medium to which the ink and the treatment liquid are superimposed and adhere in the treatment liquid adhesion step is preferably 5% by mass or greater, more preferably 7% by mass or greater, and particularly preferably 9% by mass or greater with respect to the adhesion amount of the ink composition to adhere to the recording medium in the ink adhesion step described above. Further, the adhesion amount of the treatment liquid is preferably 25% by mass or less, more preferably 21% by mass or less, still more preferably 17% by mass or less, and particularly preferably 13% by mass or less with respect to the adhesion amount of the ink composition to adhere to the recording medium in the ink adhesion step described above. When the adhesion amount of the treatment liquid is in the above-described ranges, both the image quality such as the banding unevenness or aggregation unevenness and the rub resistance tend to be preferably achieved.

Further, the adhesion amount of the treatment liquid in the region of the recording medium to which the ink and the treatment liquid are superimposed and adhere is preferably in a range of 0.1 to 5 mg/inch$^2$.

Further, it is preferable that the adhesion amount of the treatment liquid in the region where the adhesion amount of the ink is the maximum, in the region of the recording medium to which the ink and the treatment liquid are superimposed and adhere, be set to be in the above-described ranges.

The surface temperature of the recording medium when the above-described ink jet ink composition adheres to the recording medium in the treatment liquid adhesion step can be set to be the same as in the ink adhesion step.

2.3 Primary Drying Step

The recording method according to the present embodiment may include a primary drying step of drying the ink jet ink composition adhering to the recording medium.

It is preferable that the recording method include the primary drying step from the viewpoint of rapidly drying the ink composition and the treatment liquid on the recording medium and enhancing the image quality. Meanwhile, since the ink and the like are rapidly dried in the primary drying step, the ink is difficult to wet-spread on the recording medium. That is, the recording medium including the primary drying step has a problem in that the banding unevenness is more likely to occur. However, according to the recording method of the present embodiment, the banding unevenness can be reduced so that the image quality (wet spreadability) is excellent, the storage stability is excellent, and the deviation in landing positions can be remarkably reduced even when the recording method includes the primary drying step.

The primary drying step is a step of drying the ink adhering to the recording medium at an early stage. The primary drying step is a step for drying at least a part of the solvent component of the ink adhering to the recording medium at least to the extent that the flow of the ink is reduced. It is preferable that the primary drying step be carried out such that the ink droplets having landed on the recording medium start drying within 0.5 seconds at the latest from the landing of the ink droplets. Further, the primary drying step may be performed on the treatment liquid adhering to the recording medium in the same manner as that for the ink.

Examples of the method for the primary drying step include a blast type method of blast (room temperature air) at room temperature to the recording medium using a fan or the like or blast (hot air) accompanied by heating the recording medium, a radiation type method using an IR heater or a microwave, a heat transfer type of heating the recording medium using a platen heater or the like, and a method of combining these methods. Here, it should be noted that the primary drying step in the present embodiment is not particularly limited as long as the drying properties of the ink can be improved and that the recording medium is not necessarily heated. Therefore, in the primary drying step of the present embodiment, the method of blast at room temperature may be used alone. Further, it is more preferable that the primary drying step be performed by the method accompanied by heating the recording medium.

When the ink is dried by blast in the primary drying step, the air speed of the blast is preferably in a range of 0.5 to 15 m/s, more preferably in a range of 0.5 to 10 m/s, still more preferably in a range of 1 to 5 m/s, and particularly preferably in a range of 2 to 3 m/s. The air speed is the air speed in the vicinity of the surface of the recording medium.

The air temperature of the blast is preferably 55° C. or lower, preferably 10° C. or higher, more preferably in a range of 15° C. to 50° C., still more preferably in a range of 20° C. to 49° C., even still more preferably in a range of 23° C. to 40° C., even still more preferably in a range of 25° C. to 35° C., and even still more preferably in a range of 25° C. to 28° C. The air temperature of the blast may be room temperature.

Further, it is preferable that the surface temperature of the recording medium in the primary drying step be set to be in the temperature ranges described as the surface temperatures of the recording medium in the above-described ink adhesion step. That is, the surface temperature of the recording medium in the primary drying step is particularly preferably 55° C. or lower and more preferably the surface temperature ranges described above.

When the drying temperature in the primary drying step is in the above-described ranges, the banding unevenness can be further reduced so that the image quality (wet spreadability) can be enhanced, and satisfactory clogging recovering properties tend to be obtained.

Further, when heating of the recording medium is accompanied in the primary drying step, the primary drying step may be performed such that the ink adheres to the heated recording medium or the recording medium may be heated at an early stage after adhesion of the ink to the recording medium. It is preferable that the primary drying step be carried out such that the ink droplets having landed on the recording medium start drying within 0.5 seconds at the latest from the landing of the ink droplets.

When heating of the recording medium is accompanied in the primary drying step, the heating may be performed at least at the timing before the above-described ink adhesion step, simultaneously with the adhesion, or at an early stage after the adhesion, and it is preferable that the heating be performed simultaneously with the adhesion. The ink adhesion step can be performed in such heating order.

The surface temperature of the recording medium in the primary drying step is the surface temperature of the recording medium during the adhesion of the ink when the ink adheres to the recording medium on which the primary drying step has been performed and is the surface temperature of the recording medium when the primary drying step is performed in a case where the primary drying step is performed at an early stage after the adhesion of the ink. Further, the surface temperature thereof is the temperature maximized by the primary drying step during the primary drying step. It is preferable that the surface temperature of the recording medium in the primary drying step at such timings be in the above-described ranges of the surface temperature of the recording medium during the adhesion of the ink.

Further, the surface temperature of the recording medium when heating of the recording medium is not accompanied in the primary drying step is the surface temperature of the recording medium during the adhesion of the ink.

2.4 Post-Heating Step

The recording method according to the present embodiment may include a post-heating step of heating the recording medium after the ink adhesion step described above.

The ink jet ink composition used for the recording method according to the present embodiment contains the sparingly water-soluble low-molecular-weight organic compound, and thus the drying properties of the ink after the ink adhesion step are further enhanced as compared when the ink jet ink composition does not contain the sparingly water-soluble low-molecular-weight organic compound. Further, it is preferable that the recording method according to the present embodiment include the post-heating step from the viewpoint that the drying properties can be further improved and thus a recorded material with more excellent rub resistance tends to be obtained.

The post-heating step is a heating step of completing the recording and sufficiently heating the recording medium to the extent that the recorded material can be used. The post-heating step is a heating step of sufficiently drying the solvent component of the ink or the treatment liquid and heating the resin and the like contained in the ink to flatten the coating film of the ink. It is preferable that the post-heating step be started longer than 0.5 seconds after the adhesion of the ink and the treatment liquid to the recording medium. For example, it is preferable that a certain recording region of the recording medium start heating longer than 0.5 seconds after completion of adhesion of all the ink and the treatment liquid to the recording region of the recording medium. Further, it is preferable that the preferable temperature in the primary drying step be different from the preferable temperature in the post-heating step.

The recording medium in the post-heating step can be heated, for example, by using an appropriate heating unit when an ink jet recording device is used. Further, the heating unit provided in the ink jet recording device is not limited, and the recording medium can be heated using an appropriate heating unit. Further, the surface temperature of the recording medium in this case is preferably 60° C. or higher, more preferably 70° C. or higher, still more preferably 80° C. or higher, and particularly preferably 85° C. or higher. Further, the surface temperature of the recording medium heated in the post-heating step is preferably 120° C. or lower, more preferably 110° C. or lower, still more preferably 100° C. or lower, and particularly preferably 95° C. or lower. According to the recording method of the present embodiment, even when the surface temperature of the recording medium is in the above-described ranges, the ink is sufficiently dried, and a recorded material with excellent rub resistance tends to be obtained.

2.5 Recording Mode

It is preferable that the recording method according to the present embodiment be carried out by performing main scanning a plurality of times to record an image and that the main scanning be performed a plurality of times on the same scanning region. In such a recording mode, the amount of ink droplets to adhere to the recording medium in the main scanning performed once is decreased. In addition, since the ink droplets discretely adhere to the recording medium, the possibility that adjacent ink droplets come into contact with each other is decreased. That is, in this recording mode, the ink poorly fills the space on the recording medium, and the banding unevenness in which streak-like unevenness appears on the recorded image is more likely to occur. On the contrary, according to the recording method of the present embodiment, since the above-described ink jet ink composition is used, the banding unevenness can be reduced so that the image quality (wet spreadability) is excellent, the storage stability is excellent, and the deviation in landing positions can be remarkably reduced even in such a recording mode.

The number of times of the main scanning is preferably in a range of 2 to 20, more preferably in a range of 3 to 15, and still more preferably in a range of 4 to 10. Further, the expression "main scanning is performed a plurality of times on the same scanning region" denotes that the main scanning is performed again on the region where the main scanning has performed once. For example, when the distance of sub-scanning carried out once is shorter than the length of the nozzle array for jetting the ink in a sub-scanning direction, scanning is performed again on the scanning region where the main scanning is performed once. More specifically, the main scanning is performed four times on the same scanning region when the distance of sub-scanning carried out once is ¼ of the length of the nozzle array for jetting the ink in the sub-scanning direction. In this case, the number of times of the main scanning is 4.

Further, the recording method according to the present embodiment may be a line type recording method of performing scanning once by using a line head to record an image. Even in this case, streak-like unevenness may occur in the scanning direction, but according to the present embodiment, the banding unevenness can be reduced so that the image quality (wet spreadability) tends to be excellent.

2.6 Ink Jet Recording Device

An example of an ink jet recording device that can be preferably applied in the recording method according to the present embodiment will be described with reference to the accompanying drawings.

Figure 2:
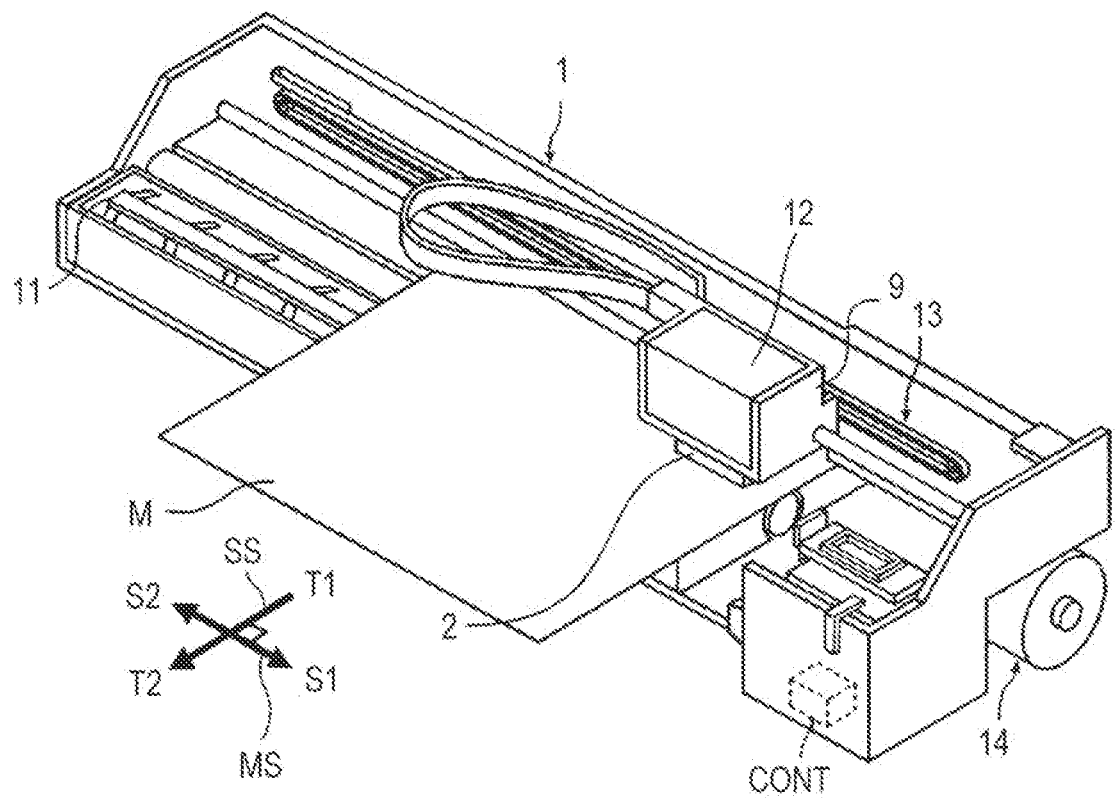
FIG. 2 is a schematic view showing the periphery of a carriage of the example of the ink jet recording device.

FIG. 1 is a schematic cross-sectional view schematically showing an ink jet recording device. FIG. 2 is a perspective view showing an example of a configuration of the periphery of a carriage of an ink jet recording device 1 of FIG. 1. As shown in FIGS. 1 and 2, the ink jet recording device 1 includes a recording head 2, an IR heater 3, a platen heater 4, a heating heater 5, a cooling fan 6, a preheater 7, a ventilation fan 8, a carriage 9, a platen 11, a carriage moving mechanism 13, a transport unit 14, and a control unit CONT. In the ink jet recording device 1, the operation of the entire ink jet recording device 1 is controlled by the control unit CONT shown in FIG. 2.

The recording head 2 is configured to perform recording on a recording medium M by jetting the ink jet ink composition from a nozzle of the recording head 2 to make the ink adhere to the recording medium M. The same applies to the treatment liquid. The recording head 2 shown in FIGS. 1 and 2 is a serial type recording head and performs scanning on the recording medium M a plurality of times in a relatively main scanning direction so that the ink and the treatment liquid adhere to the recording medium M. The recording head 2 is mounted on the carriage 9 shown in FIG. 2. The recording head 2 performs scanning on the recording medium M a plurality of times in a relatively main scanning direction due to an operation of the carriage moving mechanism 13 that allows the carriage 9 to move in a medium width direction of the recording medium M. The medium width direction is a main scanning direction of the recording head 2. The scanning carried out in the main scanning direction is also referred to as main scanning.

Here, the main scanning direction is a direction in which the carriage 9 on which the recording head 2 is mounted moves. In FIG. 1, the main scanning direction is a direction intersecting a sub-scanning direction which is a transport direction of the recording medium M indicated by an arrow SS. In FIG. 2, the width direction of the recording medium M, that is, the direction indicated by S1-S2 is a main scanning direction MS, and the direction indicated by T1→T2 is a sub-scanning direction SS. Further, scanning is performed in the main scanning direction, that is, any one direction of the arrow S1 or the arrow S2 by performing scanning once. Further, an image is recorded on the recording medium M by repeatedly performing main scanning of the recording head 2 and sub-scanning which is the transport of the recording medium M a plurality of times.

The cartridge 12 that supplies the ink and the treatment liquid to the recording head 2 includes a plurality of independent cartridges. The cartridge 12 is detachably attached to the carriage 9 on which the recording head 2 is mounted. A plurality of cartridges are respectively filled with different kinds of ink jet ink compositions and different kinds of treatment liquids, and the ink jet ink compositions and the treatment liquids are supplied to respective nozzles from the cartridge 12. In FIGS. 1 and 2, an example in which the cartridge 12 is attached to the carriage 9 is shown, but the present disclosure is not limited thereto, and a form in which the cartridge 12 is provided at a position other than the carriage 9 and the ink jet ink compositions and the treatment liquids are supplied to respective nozzles through supply pipes (not shown) may be employed.

The ink jet ink composition can be jetted from the recording head 2 using a known method of the related art. Here, a method of jetting liquid droplets using vibration of a piezoelectric element, that is, a jetting method of forming ink droplets by mechanical deformation of an electrostrictive element is used.

The ink jet recording device 1 may include a primary drying mechanism that dries the recording medium M when the ink and the treatment liquid are jetted from the recording head 2 and adhere to the recording medium. A primary drying mechanism of a conduction type, a blast type, a radiation type, or the like can be used as the primary drying mechanism. The conduction type primary drying mechanism conducts heat from a member that comes into contact with the recording medium to the recording medium, and examples thereof include a platen heater. The blast type primary drying mechanism dries the ink or the like by blowing room temperature air or hot air to the recording medium, and examples thereof include a blast fan. The radiation type primary drying mechanism radiates radiation that generates heat to the recording medium so that the recording medium is heated, and examples thereof include IR radiation. Further, a heater similar to the platen heater may also be provided immediately downstream of the platen heater 4 (not shown) in the SS direction. These primary drying mechanisms may be used alone or in combination. For example, the ink jet recording device includes the IR heater 3 and the platen heater 4 as the primary drying mechanisms.

Further, when the IR heater 3 is used, the recording medium M can be heated in the radiation manner using infrared rays radiated from the recording head 2 side. In this manner, the recording head 2 is also likely to be heated simultaneously, but the temperature can be increased without being affected by the thickness of the recording medium M as compared to when the recording head 2 is heated from the rear surface of the recording medium M using the platen heater 4 or the like. Further, the ink jet recording device may include various fans (such as the ventilation fan 8) that apply hot air or air at the same temperature as the temperature of the environment to the recording medium M to dry the ink and the like on the recording medium M.

The platen heater 4 can heat the recording medium M at a position opposing to the recording head 2 via the platen 11. The platen heater 4 is capable of heating the recording medium M in a conduction manner and is used as necessary in the ink jet recording method.

Further, the ink jet recording device 1 may include the preheater 7 that heats the recording medium M in advance before the adhesion of the ink and the treatment liquid to the recording medium M.

The ink jet recording device may include a post-heating mechanism that heats the recording medium and dries and fixes the ink and the like after the ink adhesion step and the treatment liquid adhesion step.

The heating heater 5 used as the post-heating mechanism is a heater for drying and solidifying the ink and the like adhering to the recording medium M. When the recording medium M on which an image has been recorded is heated by the heating heater 5, the moisture and the like contained in the ink and the treatment liquid are more rapidly evaporated and scattered, and an ink film is formed by a resin contained in the ink. In this manner, the ink film is firmly fixed or bonded onto the recording medium M so that the film forming properties are enhanced, and thus an image with a high image quality can be obtained in a short time.

The ink jet recording device 1 may include the cooling fan 6. An ink coating film can be formed on the recording medium M with excellent adhesiveness by drying the ink and the like recorded on the recording medium M and cooling the ink on the recording medium M with the cooling fan 6.

The ink jet recording device includes the platen 11 that supports the recording medium M, the carriage moving mechanism 13 that moves the carriage 9 relative to the recording medium M, and the transport unit 14 that is a roller transporting the recording medium M in the sub-scanning direction, below the carriage 9. The operations of the carriage moving mechanism 13 and the transport unit 14 are controlled by the control unit CONT.

3. Examples

Hereinafter, the present disclosure will be described in more detail based on the following examples, but the present disclosure is not limited thereto. Hereinafter, "%" is on a mass basis unless otherwise specified.

3.1 Preparation of Ink Jet Ink Composition

Each component was put into a container such that the compositions listed in Table 1 and Table 2 were obtained, the mixture was mixed and stirred with a magnetic stirrer for 2 hours and filtered through a membrane filter having a pore size of 5 μm, thereby obtaining an ink jet ink composition according to each component and each comparative example. Further, the numerical values of the pigment and the resin components such as the water-dispersible resins and the nonionic water-soluble resins in the tables denote the amounts of the solid contents thereof. Further, pure water was added to the mixture such that the total mass of the composition reached 100% by mass. Further, a pigment dispersion liquid prepared in advance according to the following procedures was used as the pigment.

Preparation of Pigment Dispersion Liquid

First, 50 g of methyl ethyl ketone (MEK) was added to a flask provided with a dropping funnel, a nitrogen introduction pipe, a reflux condenser, a thermometer, and a stirring device and heated to 75° C. while nitrogen bubbling was carried out. Next, a mixture of a monomer of 80 g of butyl methacrylate, 50 g of methyl methacrylate, 15 g of styrene, and 20 g of methacrylic acid, 50 g of MEK, and 500 mg of a polymerization initiator (azobisisobutyronitrile (AIBN)) was added dropwise to the flask from the dropping funnel over 3 hours. After the dropwise addition, the mixture was heated and refluxed for 6 hours, and MEK in a volatilized amount after the mixture was naturally cooled was added to the mixture, thereby obtaining a resin solution (solid content of resin: 50% by mass, acid value: 79 mg/KOH, Tg: 65° C.). A predetermined amount of a 20 mass % sodium hydroxide aqueous solution was added as a neutralizing agent to 20 g of the solution to neutralize 100% of the salt-forming group, 50 g of a pigment (C.I. Pigment Blue 15:3) was gradually added thereto while the solution was stirred, and the solution was kneaded by a bead mill for 2 hours. Next, 200 g of ion exchange water was added to the obtained kneaded material, and the mixture was stirred and heated under reduced pressure so that MEK was distilled off. Further, the concentration of the mixture was adjusted with ion exchange water, thereby obtaining a pigment dispersion (solid content of pigment: 20% by mass, solid content of resin: 5% by weight).

3.2 Preparation of Treatment Liquid

Each component was put into a container such the compositions listed in Table 3 were obtained, and the mixture was mixed and stirred with a magnetic stirrer for 2 hours and filtered through a membrane filter having a pore size of 5 μm, thereby obtaining treatment liquids A to C. Further, the numerical values of the cationic resins in the table denote the amounts of the solid contents thereof. Further, pure water was added to the mixture such that the total mass of the composition reached 100% by mass.

TABLE 1

|  |  |  | Ink A | Ink E | Ink G | Ink H | Ink I | Ink J | Ink M | Ink N | Ink O | Ink P |
|---|---|---|---|---|---|---|---|---|---|---|---|---|
| Water-soluble low-molecular-weight organic compound (boiling point of 250° C. or lower) | Alkane-diols | PG (Boiling point of 188° C.) | 20 | 20 | 20 | 20 | 20 | 20 | 20 | 20 | 20 | 20 |
|  |  | 1, 2 HD (Boiling point of 224° C.) | 1 | 1 | 1 | 1 | 1 | 1 | 1 | 1 | 1 | 1 |
| Water-soluble low-molecular-weight organic compound (boiling point of higher than 250° C.) | Amides | CPL (Boiling point of 267° C.) | 2 | 2 | 2 | 2 | 2 | 2 | 2 | 2 | 2 | 2 |
|  | Alkanol-amines | TIPA (Boiling point of 301° C.) | 1 | 1 | 1 | 1 | 1 | 1 | 1 | 1 | 1 | 1 |
| Sparingly water-soluble low-molecular-weight organic compound | Alkane-diols | BEPG (Boiling point of 264° C.) | 1 | 1 | 1 | 1 | 1 | 1 | 0.5 | 1.5 |  |  |
|  |  | 1, 2 OD (Boiling point of 267° C.) |  |  |  |  |  |  |  |  | 1 |  |
|  | Glycol mono-ethers | EHDG (Boiling point of 277° C.) |  |  |  |  |  |  |  |  |  | 1 |
|  | Mono-alcohols | 1-Hex (Boiling point of 157° C.) |  |  |  |  |  |  |  |  |  |  |
| Surfactant | Silicone-based | BYK-349 | 0.5 | 0.5 | 0.5 | 0.5 | 0.5 | 0.5 | 0.5 | 0.5 | 0.5 | 0.5 |
|  | Acetyl-ene-based | SURFYNOL DF110D | 0.1 | 0.1 | 0.1 | 0.1 | 0.1 | 0.1 | 0.1 | 0.1 | 0.1 | 0.1 |
| Pigment dispersion liquid |  | Cyan pigment (active component) | 4 | 4 | 4 | 4 | 4 | 4 | 4 | 4 | 4 | 4 |
| Water-dispersible resin | Acryl-based | JONCRYL 631 (active component) | 6 | 6 | 6 | 6 | 6 | 6 | 6 | 6 | 6 | 6 |
|  | Poly-olefin-based | HYTEC E-6500 (active component) | 0.5 | 0.5 | 0.5 | 0.5 | 0.5 | 0.5 | 0.5 | 0.5 | 0.5 | 0.5 |
| Specific nonionic water-soluble resin | PVP | PITZCOL K-17 | 0.4 | 0.8 |  |  |  |  | 0.4 | 0.4 | 0.4 | 0.4 |
|  |  | PITZCOL K-30 |  |  | 0.4 |  |  |  |  |  |  |  |
|  | PNVA | GE191-108 (active component) |  |  |  | 0.4 |  |  |  |  |  |  |
|  | PVA | PVA-203 |  |  |  |  | 0.4 |  |  |  |  |  |
|  | PEG/PEO | PEG-6000 |  |  |  |  |  | 0.4 |  |  |  |  |
| Other nonionic water-soluble resins | PEG/PEO | PEG-1000 |  |  |  |  |  |  |  |  |  |  |
| Anionic water-soluble resin | Acryl-based | ARON A-30SL |  |  |  |  |  |  |  |  |  |  |
|  |  | Pure water | Remaining amount | Remaining amount | Remaining amount | Remaining amount | Remaining amount | Remaining amount | Remaining amount | Remaining amount | Remaining amount | Remaining amount |
|  |  | Total amount | 100 | 100 | 100 | 100 | 100 | 100 | 100 | 100 | 100 | 100 |
|  | Total amount of water-soluble low-molecular-weight organic compound having standard boiling point of 250° or lower |  | 21 | 21 | 21 | 21 | 21 | 21 | 21 | 21 | 21 | 21 |

TABLE 2

|  |  |  | Ink Q | Ink R | Ink S | Ink T | Ink B | Ink C | Ink D | Ink F | Ink K | Ink L |
|---|---|---|---|---|---|---|---|---|---|---|---|---|
| Water-soluble low-molecular-weight organic compound (boiling point of 250° C. or lower) | Alkane-diols | PG (Boiling point of 188° C.) | 20 | 25 | 10 | 20 | 20 | 20 | 20 | 20 | 20 | 20 |
|  |  | 1, 2 HD (Boiling point of 224° C.) | 1 | 1 | 1 | 1 | 1 | 1 | 1 | 1 | 1 | 1 |
| Water-soluble low-molecular-weight organic compound (boiling point of higher than 250° C.) | Amides | CPL (Boiling point of 267° C.) | 2 | 2 | 2 | 2 | 2 | 2 | 2 | 2 | 2 | 2 |
|  | Alkanol-amines | TIPA (Boiling point of 301° C.) | 1 | 1 | 1 | 1 | 1 | 1 | 1 | 1 | 1 | 1 |

TABLE 2-continued

|  |  |  | Ink Q | Ink R | Ink S | Ink T | Ink B | Ink C | Ink D | Ink F | Ink K | Ink L |
|---|---|---|---|---|---|---|---|---|---|---|---|---|
| Sparingly water-soluble low-molecular-weight organic compound | Alkane-diols | BEPG (Boiling point of 264° C.) |  | 1 | 1 | 1 | 1 |  |  | 1 | 1 | 1 |
|  |  | 1, 2 OD (Boiling point of 267° C.) |  |  |  |  |  |  |  |  |  |  |
|  | Glycol mono-ethers | EHDG (Boiling point of 277° C.) |  |  |  |  |  |  |  |  |  |  |
|  | Mono-alcohols | 1-Hex (Boiling point of 157° C.) | 1 |  |  |  |  |  |  |  |  |  |
| Surfactant | Silicone-based | BYK-349 | 0.5 | 0.5 | 0.5 | 0.5 | 0.5 | 0.5 | 0.5 | 0.5 | 0.5 | 0.5 |
|  | Acetyl-ene-based | SURFYNOL DF110D | 0.1 | 0.1 | 0.1 | 0.1 | 0.1 | 0.1 | 0.1 | 0.1 | 0.1 | 0.1 |
| Pigment dispersion liquid |  | Cyan pigment (active component) | 4 | 4 | 4 | 4 | 4 | 4 | 4 | 4 | 4 | 4 |
| Water-dispersible resin | Acryl-based | JONCRYL 631 (active component) | 6 | 6 | 6 |  | 6 | 6 | 6 | 6 | 6 | 6 |
|  | Poly-olefin-based | HYTEC E-6500 (active component) | 0.5 | 0.5 | 0.5 |  | 0.5 | 0.5 | 0.5 | 0.5 | 0.5 | 0.5 |
| Specific nonionic water-soluble resin | PVP | PITZCOL K-17 | 0.4 | 0.4 | 0.4 | 0.4 |  | 0.4 |  | 12 |  |  |
|  |  | PITZCOL K-30 |  |  |  |  |  |  |  |  |  |  |
|  | PNVA | GE191-108 (active component) |  |  |  |  |  |  |  |  |  |  |
|  | PVA | PVA-203 |  |  |  |  |  |  |  |  |  |  |
|  | PEG/PEO | PEG-6000 |  |  |  |  |  |  |  |  |  |  |
| Other nonionic water-soluble resins | PEG/PEO | PEG-1000 |  |  |  |  |  |  |  |  | 0.4 |  |
| Anionic water-soluble resin | Acryl-based | ARON A-30SL |  |  |  |  |  |  |  |  |  | 0.4 |
|  |  | Pure water | Remaining amount | Remaining amount | Remaining amount | Remaining amount | Remaining amount | Remaining amount | Remaining amount | Remaining amount | Remaining amount | Remaining amount |
|  |  | Total amount | 100 | 100 | 100 | 100 | 100 | 100 | 100 | 100 | 100 | 100 |
| Total amount of water-soluble low-molecular-weight organic compound having standard boiling point of 250° or lower |  |  | 21 | 26 | 11 | 21 | 21 | 21 | 21 | 21 | 21 | 21 |

TABLE 3

|  |  |  | Treatment liquid A | Treatment liquid B | Treatment liquid C |
|---|---|---|---|---|---|
| Water-soluble low-molecular-weight organic compound (boiling point of 250° C. or lower) | Alkanediols | PG (Boiling point of 188° C.) | 20 | 15 | 15 |
|  |  | 1,2HD (Boiling point of 224° C.) | 1 | 1 | 1 |
| Water-soluble low-molecular-weight organic compound (boiling point of higher than 250° C.) | Amides | CPL (Boiling point of 267° C.) | 2 | 2 | 2 |
| Aggregating agent | Polyvalent metal salt | Calcium formate | 4 |  |  |
|  | Cationic resin | CATIOMASTER PD-7 (active component) |  | 4 |  |
|  | Organic acid | Malonic acid |  |  | 4 |

TABLE 3-continued

|  |  |  | Treatment liquid A | Treatment liquid B | Treatment liquid C |
|---|---|---|---|---|---|
| Surfactant | Silicone-based | BYK-349 | 0.5 | 0.5 | 0.5 |
|  | Acetylene-based | SURFYNOL DF110D | 0.1 | 0.1 | 0.1 |
|  | Pure water |  | Remaining amount | Remaining amount | Remaining amount |
|  |  | Total amount | 100 | 100 | 100 |

Each component listed in Tables 1 to 3 will be described.

Water-Soluble Low-Molecular-Weight Organic Compound

PG: [propylene glycol, standard boiling point of 188° C., liquid (25° C.), completely miscible with water]

1,2HD: [1,2-hexanediol, standard boiling point of 224° C., liquid (25° C.), miscible with water]

CPL: [ε-captolactam, standard boiling point of 267° C., solid (25° C.)]

TIPA: [triisopropanolamine, standard boiling point of 301° C., solubility of 83 [g/100 g of water], solid (25° C.)] Sparingly water-soluble low-molecular-weight organic compound BEPG: [2-butyl-2-ethyl-1,3-propanediol, standard boiling point of 264° C., melting point of 43° C., solid (25° C.), solubility of 0.9 [g/100 g of water]]

1,2OD: [1,2-octanediol, standard boiling point of 267° C., melting point of 26° C., solid (25° C.), solubility of 0.8 [g/100 g of water]]

EHDG: [diethylene glycol mono-2-ethyl hexyl ether, standard boiling point of 277° C., melting point of −82° C., solid (25° C.), solubility of 0.5 [g/100 g of water]]

1-Hex: [1-hexanol, standard boiling point of 157° C., liquid (25° C.), solubility of 0.1 [g/100 g of water]]

Surfactant

BYK-349: [trade name, manufactured by BYK-Chemie GmbH, silicone-based surfactant]

SURFYNOL DF110D: [trade name, manufactured by manufactured by Air Products and Chemicals, Inc., acetylene-based surfactant]

Water-Dispersible Resin

JONCRYL 631: [trade name, manufactured by BASF SE, styrene acrylic-based resin emulsion]

HYTEC E-6500: [trade name, manufactured by Toho chemical Industry Co., Ltd., polyethylene-based wax emulsion]

Specific Nonionic Water-Soluble Resin

PVP (polyvinylpyrrolidone)

PITZCOL K-17 (trade name, manufactured by DKS Co., Ltd., polyvinylpyrrolidone, weight-average molecular weight of 9000)

PITZCOL K-30 (trade name, manufactured by DKS Co., Ltd., weight-average molecular weight of 45000)

PNVA (poly-N-vinylacetamide)

GE191-108: [trade name, manufactured by Showa Denko K.K., poly-N-vinylacetamide, weight-average molecular-weight of 10000]

PVA (polyvinyl alcohol)

PVA-203: [trade name, manufactured by Kuraray Co., Ltd., polyvinyl alcohol, weight-average molecular weight of 16000]

PEG/PEO (polyethylene glycol/polyethylene oxide)

PEG-6000: [trade name, manufactured by ADEKA Corporation, polyethylene glycol, weight-average molecular weight of 8300]

Other Nonionic Water-Soluble Resins

PEG/PEO (polyethylene glycol/polyethylene oxide)

PEG-1000: [trade name, manufactured by ADEKA Corporation, polyethylene glycol, weight-average molecular weight of 1000]

Anionic Water-Soluble Resin

ARON A-30SL: [trade name, manufactured by Toagosei Co., Ltd., ammonium polyacrylate, weight-average molecular weight of 6000]

Aggregating Agent

CATIOMASTER PD-7: [trade name, manufactured by Yokkaichi Chemical Co., Ltd., amine-epichlorohydrin-based cationic resin]

3.3 Printing Conditions

Printing in the following evaluation test was performed under the following printing conditions.

Printing Conditions

Printer: "SC-R5050", modified machine, manufactured by Seiko Epson Corporation

Resolution: 1200×1200 dpi

Number of times of scanning: 9 times

Platen heating temperature: 45° C.

Secondary drying temperature: 80° C.

Recording medium: "Orajet 3165G-010", manufactured by ORAFOL Japan Inc., PVC film Platen gap: 1.7 mm The expression "platen heating temperature" denotes the surface temperature of the recording medium in a platen region opposing to the head during the recording. Further, the expression "secondary drying temperature" denotes the surface temperature of the recording medium heated by a secondary heater at downstream of the ink jet head. Further, the time for heating and drying the recording medium at the secondary drying temperature was set to approximately 3 minutes.

3.4 Evaluation Test

3.4.1 Rub Resistance

The printer "SC-R5050" was filled with each ink jet ink composition obtained above, and a solid pattern was printed on the recording medium under the above-described printing conditions. Further, "SC-R5050" was also filled with each treatment liquid obtained above as necessary under the conditions listed in Tables 4 to 6. Here, the adhesion amount of the colored ink was set to 12 mg/inch$^2$, and the adhesion amount of the treatment liquid was set to 1 mg/inch$^2$. The recording medium was allowed to stand at room temperature for 30 minutes, the portion to which the ink had adhered was cut into a rectangular with a size of 30×150 mm, the peeling degree of the ink when the cut portion was rubbed with plain-woven fabric 100 times using a Gakushin type rub resistance tester (load of 500 g) was visually observed, and the rub resistance was determined according to the following evaluation criteria.

Evaluation Criteria
- AA: The peeling of the ink was not found
- A: The peeling of the ink was found in less than 20% of the evaluation area
- B: The peeling of the ink was found in less than 50% of the evaluation area
- C: The peeling of the ink was found in greater than or equal to 50% of the evaluation area

3.4.2 Image Quality (Wet Spreadability)

The printer "SC-R5050" was filled with each ink jet ink composition obtained above, and a solid pattern was printed on the recording medium under the above-described printing conditions. Further, "SC-R5050" was also filled with each treatment liquid obtained above as necessary under the conditions listed in Tables 4 to 6. Here, a patch pattern at a duty of 10% was printed by setting the adhesion amount of the colored ink of 20 mg/inch 2 to a duty of 100%, and the adhesion amount of the treatment liquid was set to 10% by mass of the adhesion amount of the colored ink. The printed material was visually observed, and the image quality was determined according to the following evaluation criteria.

Evaluation Criteria
- AA: Streak-like density unevenness (banding unevenness) extending in the main scanning direction was not found
- A: Banding unevenness was slightly found, but the density unevenness was small and not conspicuous.
- B: Banding unevenness was found and the density unevenness was significant, but were at an acceptable level.
- C: Banding unevenness was found and the density unevenness was significant, and both were conspicuous.

3.4.3 Clogging Recovering Properties

The printer "SC-R5050" was filled with each ink jet ink composition obtained above, and nozzle surfaces were hit by BEMCOT wet with water to intentionally cause nozzle slip-out. In this state, the printer was idled under the temperature condition based on the above-described printing conditions for 3 hours. After recording was performed, the nozzles were cleaned three times, the number of unrecovered nozzles was counted, and the clogging recovering properties were determined according to the following evaluation criteria. Here, the treatment liquids were excluded from the evaluation target. The nozzles were cleaned once to discharge 1 g of the ink from the nozzle group. Further, the nozzle group consists of 800 nozzles.

Evaluation Criteria
- AA: Nozzle failure was not found
- A: Nozzle failure was found in less than 1% of all the nozzles.
- B: Nozzle failure was found in 1% or greater and less than 3% of all the nozzles.
- C: Nozzle failure was found in 3% or greater of all the nozzles.

3.4.4 Storage Stability 30 g of each ink jet ink composition obtained above was enclosed in an aluminum pack such that air bubbles were not mixed in, and was allowed to stand in a constant-temperature bath at 60° C. for 6 days. The ink was taken out and naturally cooled, the viscosity thereof was measured with a rheometer (MCR702, manufactured by Anton Paar Japan K.K.) at a shear rate of $200\ s^{-1}$, and the viscosity increase rate was calculated by comparing the measured viscosity with the initial (immediately after the preparation of the ink) viscosity. The storage stability was determined from the obtained viscosity increase rate according to the following evaluation criteria.

Evaluation Criteria.
- A: The viscosity increase rate was less than 3%
- B: The viscosity increase rate was 3% or greater and less than 5%
- C: The viscosity increase rate was 5% or greater

3.4.5 Deviation in Landing

The printer "SC-R5050" was filled with each ink jet ink composition obtained above, the recording medium was set, and a nozzle check pattern was recorded immediately after the recording medium was flushed, to confirm that the ink was normally jetted from the nozzles. Thereafter, the printer was idled for 1 minute without allowing the nozzles to jet the ink under a platen temperature condition of 45° C., the same nozzle check pattern as described above was recorded on the recording medium. The deviation in landing of the ink was compared between nozzles after the idling operation and was determined according to the following evaluation criteria. Further, the distance in deviation of landing positions according to the evaluation criteria was set as the average value in all nozzles. Here, the nozzles with jetting failure were excluded, and the treatment liquids were excluded from the evaluation target.

Evaluation Criteria
- A: No deviation in landing positions
- B: Deviation in landing positions was within the distance between nozzles
- C: Deviation in landing positions was longer than the distance between nozzles

TABLE 4

|  |  |  | Example 1 | Example 2 | Example 3 | Example 4 | Example 5 | Example 6 | Example 7 | Example 8 |
|---|---|---|---|---|---|---|---|---|---|---|
| Colored ink |  |  | Ink A | Ink E | Ink G | Ink H | Ink I | Ink J | Ink M | Ink N |
|  | Evaluation | Storage stability | A | A | A | B | B | B | A | A |
|  |  | Deviation in landing | A | B | B | A | A | A | A | A |
| Treatment liquid |  |  | — | — | — | — | — | — | — | — |
|  | Evaluation | Rub resistance | A | B | A | A | A | A | A | A |

TABLE 4-continued

|  | Example 1 | Example 2 | Example 3 | Example 4 | Example 5 | Example 6 | Example 7 | Example 8 |
|---|---|---|---|---|---|---|---|---|
| Image quality (wet spreadability) | A | A | A | A | A | A | B | AA |
| Clogging recovering properties | A | AA | A | B | B | B | AA | B |

TABLE 5

|  |  |  | Example 9 | Example 10 | Example 11 | Example 12 | Example 13 | Example 14 | Example 15 | Example 16 | Example 17 |
|---|---|---|---|---|---|---|---|---|---|---|---|
| Colored ink |  |  | Ink O | Ink P | Ink Q | Ink R | Ink S | Ink T | Ink A | Ink A | Ink A |
|  | Evaluation | Storage stability | A | B | B | A | A | A | A | A | A |
|  |  | Deviation in landing | A | A | A | B | A | A | A | A | A |
| Treatment liquid |  |  | — | — | — | — | — | — | Treatment liquid A | Treatment liquid B | Treatment liquid C |
| Evaluation | Rub resistance |  | A | A | A | B | AA | C | B | B | B |
|  | Image quality (wet spreadability) |  | A | AA | B | A | A | A | AA | AA | A |
|  | Clogging recovering properties |  | A | B | B | AA | B | AA | A | A | A |

TABLE 6

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Colored ink |  |  | Ink B | Ink C | Ink D | Ink F | Ink K | Ink L |
|  | Evaluation | Storage stability | C | A | A | A | C | C |
|  |  | Deviation in landing | A | A | A | C | A | A |
| Treatment liquid |  |  | — | — | — | — | — | — |
| Evaluation | Rub resistance |  | AA | A | AA | C | A | B |
|  | Image quality (wet spreadability) |  | A | C | C | A | A | A |
|  | Clogging recovering properties |  | C | A | A | AA | C | B |

3.5 Evaluation Results

The evaluation results are listed in Tables 4 to 6.

Based on the evaluation results described above, in each example of the aqueous ink jet ink composition containing a pigment, a sparingly water-soluble low-molecular-weight organic compound, and a nonionic water-soluble resin, in which the pigment is a self-dispersion pigment or a resin dispersion pigment dispersed by a dispersant resin, and the nonionic water-soluble resin has a weight-average molecular weight of 2000 or greater, and the content of the nonionic water-soluble resin is 1% by mass or less with respect to the total mass of the ink composition, the banding unevenness was reduced so that the image quality (wet spreadability) was excellent, the storage stability was excellent, and the deviation in landing positions was remarkably reduced.

Based on the comparison between Example 1 and Comparative Example 1, the storage stability and the clogging recovering properties were degraded when the ink jet ink composition did not contain a nonionic water-soluble resin.

Based on the comparison between Example 1 and Comparative Examples 2 and 3, the banding unevenness was not reduced so that the image quality (wet spreadability) was degraded when the ink jet ink composition did not contain a sparingly water-soluble low-molecular-weight organic compound.

Based on the comparison between Example 1 and Comparative Example 4, the jetting characteristics were degraded and the deviation in landing occurred when the content of the nonionic water-soluble resin was not less than or equal to a predetermined amount.

Based on the comparison between Example 1 and Comparative Examples 5 and 6, the storage stability and the clogging recovering properties were degraded when the ink jet ink composition did not contain a specific nonionic water-soluble resin.

Based on the results of Examples 1 and 2, the rub resistance and the jetting characteristics of the ink such as deviation in landing positions were likely to be further enhanced while the excellent storage stability was maintained when the content of the specific nonionic water-soluble resin was in a predetermined range.

Based on the results of Examples 1 and 3 to 6, the storage stability and the clogging recovering properties were excellent in various specific nonionic water-soluble resins.

Based on the results of Examples 1, 7, and 8, the image quality (wet spreadability) and the clogging recovering properties were likely to be enhanced in a well-balanced manner when the content of the sparingly water-soluble low-molecular-weight organic compound was in a predetermined range.

Based on the results of Examples 1 and 9 to 11, the image quality (wet spreadability) was excellent in various sparingly water-soluble low-molecular-weight organic compounds.

Based on the results of Examples 1, 12, and 13, the rub resistance, the clogging recovering properties, and the deviation in landing positions were likely to be enhanced in a well-balanced manner when the content of the water-soluble low-molecular-weight organic compound having a standard boiling point of 250° C. or lower was in a predetermined range.

Based on the results of Examples 1 and 14, the rub resistance was more excellent when the ink jet ink composition contained a water-dispersible resin.

Based on the results of Examples 1 and 15 to 17, the banding unevenness was reduced so that the image quality (wet spreadability) was excellent even when the ink jet ink composition was used for recording together with the treatment liquid containing an aggregating agent.

Although not listed in Tables 4 to 6, a reference example in which an ink D was used was also evaluated under the same printing conditions as described above except that a plain paper roll (manufactured by Seiko Epson Corporation, plain paper) was used as the recording medium. In this case, the problem of banding unevenness did not occur.

The following contents are derived from the above-described embodiments.

According to an aspect, an ink jet ink composition is an aqueous ink jet ink composition containing a pigment, a sparingly water-soluble low-molecular-weight organic compound, and a nonionic water-soluble resin, in which the pigment is a self-dispersion pigment or a resin dispersion pigment dispersed by a dispersant resin, and the nonionic water-soluble resin has a weight-average molecular weight of 2000 or greater, and the content of the nonionic water-soluble resin is 1% by mass or less with respect to a total mass of the ink composition.

In the aspect of the ink jet ink composition, the sparingly water-soluble low-molecular-weight organic compound may contain any one or more of alkanediols, monoalcohols, and glycol monoethers.

In the aspect of the ink jet ink composition, the nonionic water-soluble resin may contain any one or more of polyvinylpyrrolidone, poly-N-vinylacetamide, polyvinyl alcohol, and polyalkylene oxide.

In the aspect of the ink jet ink composition, the content of the sparingly water-soluble low-molecular-weight organic compound may be 0.1% by mass or greater and 2% by mass or less with respect to the total mass of the ink composition.

In the aspect of the ink jet ink composition, the ink jet ink composition may further contain a water-soluble low-molecular-weight organic compound having a standard boiling point of 250° C. or lower, and the content of the water-soluble low-molecular-weight organic compound having a standard boiling point of 250° C. or lower may be 5% by mass or greater and 30% by mass or less with respect to the total mass of the ink composition.

In the aspect of the ink jet ink composition, the ink jet ink composition may further contain a water-dispersible resin, and the water-dispersible resin may contain any one or more of an acrylic resin, a polyurethane-based resin, a polyester-based resin, and a polyolefin-based resin.

In the aspect of the ink jet ink composition, the ink jet ink composition may be used for performing recording on a low-absorbing recording medium or a non-absorbing recording medium.

In the aspect of the ink jet ink composition, the ink jet ink composition may be used for performing recording together with a treatment liquid that contains an aggregating agent.

According to an aspect, a recording method is a method including an ink adhesion step of jetting the ink jet ink composition described above using an ink jet method to make the ink jet ink composition adhere to a recording medium.

In the aspect of the recording method, recording may be performed by carrying out main scanning a plurality of times, and the main scanning may be performed a plurality of times on an identical scanning region.

In the aspect of the recording method, the recording method may further include a primary drying step of drying the ink jet ink composition adhering to the recording medium.

In the aspect of the recording method, the recording method may further include a post-heating step of heating the recording medium after the ink adhesion step.

The present disclosure is not limited to the above-described embodiments, and various modifications can be made. For example, the present disclosure has configurations that are substantially the same as the configurations described in the embodiments, for example, configurations with the same functions, the same methods, and the same results as described above or configurations with the same purposes and the same effects as described above. Further, the present disclosure has configurations in which parts that are not essential in the configurations described in the embodiments have been substituted. Further, the present disclosure has configurations exhibiting the same effects as the effects of the configurations described in the embodiments or configurations capable of achieving the same purposes as the purposes of the configurations described in the embodiments. Further, the present disclosure has configurations in which known techniques have been added to the configurations described in the embodiments.

What is claimed is:

1. An aqueous ink jet ink composition comprising:
a pigment;
a sparingly water-soluble low-molecular-weight organic compound; and
a nonionic water-soluble resin,
wherein the pigment is a self-dispersion pigment or a resin dispersion pigment dispersed by a dispersant resin, and
the nonionic water-soluble resin has a weight-average molecular weight of 3000 or greater and 20000 or less, and a content of the nonionic water-soluble resin is 1% by mass or less with respect to a total mass of the ink composition.

2. The ink jet ink composition according to claim 1, wherein the sparingly water-soluble low-molecular-weight organic compound contains any one or more of alkanediols, monoalcohols, and glycol monoethers.

3. The ink jet ink composition according to claim 1,
wherein the nonionic water-soluble resin contains at least one of polyvinylpyrrolidone and poly-N-vinylacetamide.

4. The ink jet ink composition according to claim 1,
wherein a content of the sparingly water-soluble low-molecular-weight organic compound is 0.1% by mass or greater and 2% by mass or less with respect to the total mass of the ink composition.

5. The ink jet ink composition according to claim 1, further comprising:
a water-soluble low-molecular-weight organic compound having a standard boiling point of 250° C. or lower,
wherein a content of the water-soluble low-molecular-weight organic compound having a standard boiling point of 250° C. or lower is 5% by mass or greater and 30% by mass or less with respect to the total mass of the ink composition.

6. The ink jet ink composition according to claim 1, further comprising:
a water-dispersible resin,
wherein the water-dispersible resin contains any one or more of an acrylic resin, a polyurethane-based resin, a polyester-based resin, and a polyolefin-based resin.

7. The ink jet ink composition according to claim 1,
wherein the ink jet ink composition is used for performing recording on a low-absorbing recording medium or a non-absorbing recording medium.

8. The ink jet ink composition according to claim 1,
wherein the ink jet ink composition is used for performing recording together with a treatment liquid that contains an aggregating agent.

9. A recording method comprising:
an ink adhesion step of jetting the ink jet ink composition according to claim 1 using an ink jet method to make the ink jet ink composition adhere to a recording medium.

10. The recording method according to claim 9,
wherein recording is performed by carrying out main scanning a plurality of times, and
the main scanning is performed a plurality of times on an identical scanning region.

11. The recording method according to claim 9, further comprising:
a primary drying step of drying the ink jet ink composition adhering to the recording medium.

12. The recording method according to claim 9, further comprising:
a post-heating step of heating the recording medium after the ink adhesion step.

* * * * *